US011932313B2

(12) United States Patent
Savard et al.

(10) Patent No.: US 11,932,313 B2
(45) Date of Patent: Mar. 19, 2024

(54) CARGO BOX EXTENSION ASSEMBLY, TAILGATE ASSEMBLY, AND VEHICLE WITH SAME

(71) Applicant: BOMBARDIER RECREATIONAL PRODUCTS INC., Valcourt (CA)

(72) Inventors: Laurent Savard, Granby (CA); Patrick Mathieu, Granby (CA); Hugo Martin, Knowlton (CA); Hubert Bilodeau, Orford (CA); Mathieu Caille, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/671,703

(22) Filed: Feb. 15, 2022

(65) Prior Publication Data

US 2022/0258810 A1    Aug. 18, 2022

Related U.S. Application Data

(60) Provisional application No. 63/149,785, filed on Feb. 16, 2021.

(51) Int. Cl.
*B62D 33/027* (2006.01)
*B60P 3/40* (2006.01)
*B62D 33/03* (2006.01)

(52) U.S. Cl.
CPC ............ *B62D 33/0273* (2013.01); *B60P 3/40* (2013.01); *B62D 33/03* (2013.01)

(58) Field of Classification Search
CPC .. B62D 33/0273; B62D 33/03; B62D 33/033; B62D 33/027; B60P 3/40
See application file for complete search history.

(56) References Cited

U.S. PATENT DOCUMENTS 4,472,639 A * 9/1984 Bianchi ............. B62D 33/0273
296/26.11
4,584,739 A * 4/1986 Konen .................... E05D 7/105
16/266

(Continued)

OTHER PUBLICATIONS

Pickuptrucks.com; New Product Spotlight: Hideaway Bed Extender; Mar. 27, 2014; pp. 1-2; retrieved from https://news.pickuptrucks.com/2014/03/new-product-spotlight-hideaway-bed-extender.html on Feb. 15, 2021.

*Primary Examiner* — Gregory A Blankenship
(74) *Attorney, Agent, or Firm* — BCF LLP

(57) ABSTRACT

A cargo box extension assembly for a cargo box of a vehicle and method of operating the extension assembly. The assembly includes a center panel configured and arranged for pivotally connecting to a front surface of a tailgate of the cargo box; a left panel; and a right panel, each of the left and right panels being rotatable between an open position and a closed position where the left and right panels are aligned with each other, when the cargo box extension assembly is installed on the tailgate of the vehicle and the center panel is pivotally connected to the front surface of the tailgate: the cargo box extension assembly being selectively movable between a collapsed position and an extended position; in the collapsed position, the cargo box extension assembly being at least partially received in a recess of the tailgate.

18 Claims, 24 Drawing Sheets

(56) References Cited

U.S. PATENT DOCUMENTS

| | | | | |
|---|---|---|---|---|
| 5,775,759 A * | 7/1998 | Cummins | B62D 33/0273 | 296/26.11 |
| 5,788,311 A * | 8/1998 | Tibbals | B62D 33/0273 | 296/26.11 |
| 5,857,724 A * | 1/1999 | Jarman | B62D 33/037 | 296/26.11 |
| 5,902,000 A * | 5/1999 | Wold | B62D 33/0273 | 296/26.11 |
| 6,007,127 A * | 12/1999 | Garofalo | B60P 3/42 | 296/26.11 |
| 6,142,548 A * | 11/2000 | Kuhn | B60P 3/40 | 296/57.1 |
| 6,155,622 A * | 12/2000 | Reed | B62D 33/0273 | 296/57.1 |
| 6,158,797 A * | 12/2000 | Bauer | B60P 1/435 | 296/61 |
| 6,179,360 B1 * | 1/2001 | Davian | B62D 33/033 | 296/26.11 |
| 6,193,294 B1 * | 2/2001 | Disner | B62D 33/08 | 296/26.11 |
| 6,279,980 B1 * | 8/2001 | Straschewski | B62D 33/0273 | 296/26.11 |
| 6,340,190 B1 * | 1/2002 | Rosebrugh | B60P 3/40 | 296/26.11 |
| 6,378,926 B1 * | 4/2002 | Renze | B60P 3/40 | 296/183.1 |
| 6,422,627 B1 * | 7/2002 | Kuhn | B62D 33/0273 | 296/57.1 |
| 6,422,630 B1 * | 7/2002 | Heaviside | B62D 33/0273 | 296/26.11 |
| 6,513,850 B1 * | 2/2003 | Reed | B62D 33/0273 | 296/57.1 |
| 6,550,841 B1 * | 4/2003 | Burdon | B60P 3/40 | 296/26.11 |
| 6,908,134 B1 * | 6/2005 | Summers | B60P 3/40 | 296/26.11 |
| 7,021,689 B1 * | 4/2006 | Weisbeck, III | B62D 33/0273 | 296/26.11 |
| 7,111,886 B1 * | 9/2006 | Miller | B60P 7/0892 | 296/26.11 |
| 7,175,218 B1 * | 2/2007 | Keene | B60P 3/40 | 296/57.1 |
| 8,182,012 B1 * | 5/2012 | Brister | B60P 3/40 | 296/26.11 |
| 9,302,717 B1 * | 4/2016 | Rude | B60P 3/40 | |
| 9,452,782 B1 * | 9/2016 | Singer | B62D 33/0273 | |
| 9,592,860 B1 * | 3/2017 | Singer | B62D 33/0273 | |
| 9,809,142 B1 * | 11/2017 | White | B62D 33/0273 | |
| 2002/0000732 A1 * | 1/2002 | Sanders | B60P 3/40 | 296/26.08 |
| 2002/0023938 A1 * | 2/2002 | Kmita | B60R 5/041 | 224/403 |
| 2006/0033352 A1 * | 2/2006 | King | B62D 33/0273 | 296/26.11 |
| 2007/0236034 A1 * | 10/2007 | Stewart | B62D 33/0273 | 296/57.1 |
| 2009/0309381 A1 * | 12/2009 | Nelson | B62D 33/0273 | 296/26.11 |
| 2010/0026027 A1 * | 2/2010 | Gao | B62D 33/0273 | 296/26.11 |
| 2010/0078955 A1 * | 4/2010 | Smith | B62D 25/2054 | 296/26.11 |
| 2013/0049395 A1 * | 2/2013 | Poirier | B60R 5/041 | 296/37.6 |
| 2017/0158254 A1 * | 6/2017 | Singer | B62D 21/14 | |
| 2017/0282979 A1 * | 10/2017 | Singer | B62D 21/14 | |
| 2018/0015962 A1 * | 1/2018 | Spahn | B62D 33/0273 | |
| 2021/0348433 A1 * | 11/2021 | Schalyo | B62D 35/007 | |
| 2022/0136297 A1 * | 5/2022 | Roberson | E05D 15/26 | 49/37 |
| 2022/0258810 A1 * | 8/2022 | Savard | B62D 33/0273 | |
| 2022/0396319 A1 * | 12/2022 | Christensen | B60R 5/041 | |

\* cited by examiner

CARGO BOX EXTENSION ASSEMBLY, TAILGATE ASSEMBLY, AND VEHICLE WITH SAME

CROSS-REFERENCE

The present application claims priority to U.S. Provisional Patent Application No. 63/149,785, entitled "Cargo Box Extension Assembly, Tailgate Assembly, and Vehicle with Same," filed Feb. 16, 2021, the entirety of which is incorporated herein by reference.

FIELD OF TECHNOLOGY

The present technology relates to cargo box extension assemblies, tailgate assemblies having a cargo box extension assembly, and off-road vehicles having a cargo box extension assembly.

BACKGROUND

Off-road vehicles, such as side-by-side off-road vehicles (SSVs), all-terrain vehicles (ATVs), and the like, are used for both utility and recreational purposes. To provide the capability to transport cargo in such vehicles, these vehicles often include cargo boxes with a cargo area defined therein.

For transporting larger objects in the cargo area, it can be desirable to provide additional cargo space. In some cases, this can be done by lowering a tailgate and connecting a rear wall to the open tailgate (sometimes referred to as a box extender), thereby increasing the area within the cargo box. In order to have the ability to selectively increase the cargo area, however, would require an operator to transport or store the extender. This could decrease the amount of available cargo area when the extender is not installed but is instead being transported in the cargo box.

Therefore, there is a desire for a solution for off-road vehicles to provide flexibility in cargo area arrangements.

SUMMARY

It is an object of the present technology to ameliorate at least some of the inconveniences present in the prior art.

According to one aspect of the present technology, there is provided a cargo box extension assembly for connecting to a tailgate of a cargo box of a vehicle. The assembly includes a center panel extending laterally across the opened tailgate (when in an extended position), as well as left and right panels pivotally connected to the center panel. The left and right panels selectively connect the center panel to the side walls of the cargo box, such that the extension assembly defines a rear side of the cargo area (while the tailgate is in the open position). In this way, the assembly provides a greater cargo area when in the extended position than the cargo box provides when the tailgate is in the closed position, while still providing a closed rear side to contain cargo in the cargo area.

The assembly, when in a collapsed position, is further received at least partially in a recess in the tailgate, such that the presence of the assembly in the tailgate, while collapsed, does not generally impede movement of cargo into and out of the cargo box with the tailgate in an open position. This also permits the assembly to be transported without occupying a large portion of the cargo area and avoids the need to remove and/or store the extension assembly elsewhere when not in use. The assembly is further selectively installable in and removable from the tailgate through the use of two selectively separable hinges, providing a "tool-less installation". The two cooperating hinge components are shaped to allow separation (or insertion) at a pre-determined angle, where the assembly can be removed from the tailgate simply by sliding the hinges apart and the assembly can be connected to the tailgate by sliding the hinges together.

According to one aspect of the present technology, there is provided a cargo box extension assembly for a cargo box of a vehicle. The assembly includes a center panel configured and arranged for pivotally connecting to a front surface of a tailgate of the cargo box; a left panel pivotally connected to a left end portion of the center panel at a first end of the left panel, a second end of the left panel being configured to selectively connect to a left, rear portion of the cargo box; and a right panel pivotally connected to a right end portion of the center panel at a first end of the right panel, a second end of the right panel being configured to selectively connect to a right, rear portion of the cargo box, each of the left panel and the right panel being rotatable between at least an open position and a closed position, in the open position, the second end of each of the left panel and the right panel being rotated outward away from the center panel, in the closed position, the second end of each of the left panel and the right panel being rotated inward toward the center panel, each of the left panel and the right panel being arranged generally parallel to the center panel and aligned with each other, when the cargo box extension assembly is installed on the tailgate of the vehicle and the center panel is pivotally connected to the front surface of the tailgate: the cargo box extension assembly being selectively movable between at least a collapsed position and an extended position; in the collapsed position: each of the left panel and the right panel being arranged in the closed position, the center panel being arranged generally parallel to the front surface of the tailgate, and the cargo box extension assembly being at least partially received in a recess of the tailgate, in the extended position: the center panel is arranged generally perpendicular to the front surface of the tailgate, and each of the left panel and the right panel are arranged in the open position.

In some embodiments, the center panel defines at least one panel recess; and when in the closed position, the left panel and the right panel are at least partially received in the at least one panel recess.

In some embodiments, the assembly further includes at least one first hinge portion connected to the center panel, the at least one first hinge portion being configured to pivotally connect to at least one second hinge portion connected to the tailgate.

In some embodiments, the assembly further includes the at least one second hinge portion configured to connect to the tailgate.

In some embodiments, the at least one first hinge portion includes: a first left hinge portion, and a first right hinge portion; the at least one second hinge portion includes: a second left hinge portion, and a second right hinge portion; the first left hinge portion being configured to pivotally connect to the second left hinge portion; and the first right hinge portion being configured to pivotally connect to the second right hinge portion.

In some embodiments, the first left hinge portion and the first right hinge portion extend in a same direction; the first left hinge portion and the first right hinge portion are arranged to be removed from and inserted into the second left hinge portion and the second right hinge portion by translation, the cargo box extension assembly thereby being configured and arranged to be removed from the tailgate by translation.

In some embodiments, the at least one first hinge portion is at least one male hinge portion; and the at least one second hinge portion is at least one female hinge portion defining an aperture therein for receiving the at least one male hinge portion.

In some embodiments, the at least one male hinge portion includes: a cylindrical member, and a non-cylindrical distal end portion disposed at a distal end of the cylindrical member, the distal end portion having a maximum outer diameter greater than an outer diameter of the cylindrical member; the aperture of the at least one female hinge portion is non-circular, the aperture being sized and arranged to receive the distal end portion of the at last one male hinge portion therethrough at least one pre-determined relative orientation between the at least one male hinge portion and the at least one female hinge portion; the aperture is sized and arranged to impede the distal end portion from passing therethrough when the at least one male hinge portion and the at least one female hinge portion are not arranged at the at least one pre-determined relative orientation; and the aperture is sized and arranged to allow rotation of the cylinder member therein when the cylinder member is disposed in the aperture.

In some embodiments, when the assembly is installed on the tailgate of the vehicle and the center panel is pivotally connected to the front surface of the tailgate: the cargo box extension assembly is selectively movable between at least a collapsed position and an extended position; in the collapsed position: each of the left panel and the right panel are arranged in the closed position, and the center panel is arranged generally parallel to the front surface of the tailgate; in the extended position: the center panel is arranged generally perpendicular to the front surface of the tailgate, and each of the left panel and the right panel are arranged in the open position; the aperture and the distal end portion are not arranged in the at least one pre-determined relative orientation when the cargo box extension assembly is in the collapsed position; and the aperture and the distal end portion are not arranged in the at least one pre-determined relative orientation when the cargo box extension assembly is in the extended position.

In some embodiments, to align the aperture and the distal end portion at the at least one pre-determined relative orientation, the center panel is rotated past vertical.

In some embodiments, the distal end portion of the at least one male hinge portion is generally bow-tie shaped; and the aperture of the at least one female hinge portion is generally bow-tie shaped.

In some embodiments, the center panel includes: a frame; and a wall portion connected to the frame.

In some embodiments, the frame further includes a plurality of rigid members including a top member, a bottom member, a left member and a right member; and a plurality of corner brackets connecting the plurality of rigid members together.

In some embodiments, the top member is fastened to a top, left bracket and a top, right bracket of the plurality of corner brackets; the bottom member is fastened to a bottom, left bracket and a bottom, right bracket of the plurality of corner brackets; the right member is pivotally connected to the top, right bracket and the bottom, right bracket; and the left member is pivotally connected to the top, left bracket and the bottom, left bracket.

In some embodiments, the first end of the right panel is connected to the right member of the frame; and the first end of the left panel is connected to the left member of the frame.

According to another aspect of the present technology, there is provided a tailgate assembly for an off-road vehicle. The tailgate assembly includes a tailgate configured for pivotally connecting to a box floor of a cargo box of the vehicle, the tailgate defining a recess in a front surface thereof, when the tailgate is connected to the vehicle, the tailgate being selectively rotatable between at least a closed position and an open position: in the closed position, the front surface of the tailgate being arranged generally vertically and facing forward, and in the open position, the front surface of the tailgate being arranged generally horizontally and facing upward; and a cargo box extension assembly pivotally connected to the tailgate, the cargo box extension assembly including a center panel pivotally connected to the front surface of the tailgate, a left panel pivotally connected to a left end portion of the center panel at a first end of the left panel, a second end of the left panel being configured to selectively connect to the left side wall of the cargo box; and a right panel pivotally connected to a right end portion of the center panel at a first end of the right panel, a second end of the right panel being configured to selectively connect to the right side wall of the cargo box, each of the left panel and the right panel being rotatable between at least an open position and a closed position, in the open position, the second end of each of the left panel and the right panel being rotated outward away from the center panel, in the closed position, the second end of each of the left panel and the right panel being rotated inward toward the center panel, each of the left panel and the right panel being arranged generally parallel to the center panel and aligned with each other, the cargo box extension assembly being selectively movable between at least a collapsed position and an extended position when the tailgate is in the open position; in the collapsed position: each of the left panel and the right panel being arranged in the closed position, the center panel being arranged generally horizontally and parallel to the front surface of the tailgate, and the cargo box extension assembly being received at least partially in the recess of the tailgate, in the extended position: the center panel being arranged generally vertical and perpendicular to the front surface of the tailgate, and each of the left panel and the right panel being arranged in the open position.

In some embodiments, the tailgate assembly further includes at least one hinge connecting the center panel to the front surface of the tailgate.

In some embodiments, the at least one hinge is disposed at least partially above the center panel when the tailgate is in the closed position.

In some embodiments, the tailgate assembly further includes at least one latch connected to the tailgate, the at least one latch being arranged and configured to selectively maintain the cargo box extension assembly in the collapsed position and at least partially in the recess of the tailgate.

In some embodiments, the at least one latch is at least partially deformable; and the at least one latch is configured to selectively connect to the center panel when the cargo box extension assembly is in the collapsed position.

According to yet another aspect of the present technology, there is provided a cargo box for a vehicle, the cargo box including the box floor; a front wall extending upward from the box floor; the right side wall extending upwardly from a right side of the floor; the left side wall extending upwardly from a left side of the floor; and the tailgate assembly of an above embodiment pivotally connected to the box floor.

According to yet another aspect of the present technology, there is provided an off-road vehicle including a frame; a motor connected to the frame; a plurality of ground engaging members operatively connected to the frame, at least one ground engaging member of the plurality of ground engaging members being operatively connected to the motor; a seat connected to the frame; a cargo box connected to the frame rearward of the seat, the cargo box having a floor, a front wall extending upwardly from a front end of the floor, a left side wall extending upwardly from a left side of the floor, a right side wall extending upwardly from a right side of the floor; a tailgate pivotally connected to the floor of the cargo box, the tailgate defining a recess in a front surface thereof, the tailgate being selectively rotatable between at least a closed position and an open position: in the closed position, the front surface of the tailgate being arranged generally vertically and facing forward, and in the open position, the front surface of the tailgate being arranged generally horizontally and facing upward; and a cargo box extension assembly pivotally connected to the tailgate, the cargo box extension assembly including a center panel pivotally connected to the front surface of the tailgate, a left panel pivotally connected to a left end portion of the center panel at a first end of the left panel, a second end of the left panel being configured to selectively connect to the left side wall of the cargo box, and a right panel pivotally connected to a right end portion of the center panel at a first end of the right panel, a second end of the right panel being configured to selectively connect to the right side wall of the cargo box, each of the left panel and the right panel is selectively rotatable between at least an open position and a closed position, in the open position, each of the left panel and the right panel is rotated outward away from a first surface of the center panel, in the closed position, each of the left panel and the right panel is rotated inward toward the first surface of the center panel, each of the left panel and the right panel being arranged generally parallel to the center panel and aligned with each other, the cargo box extension assembly being selectively movable between at least a collapsed position and an extended position when the tailgate is in the open position; in the collapsed position: each of the left panel and the right panel being arranged in the closed position, the center panel being arranged generally horizontally and parallel to the front surface of the tailgate, and the cargo box extension assembly being received at least partially in the recess of the tailgate; and in the extended position: the center panel being arranged generally vertical and perpendicular to the front surface of the tailgate, and each of the left panel and the right panel being arranged in the open position.

In some embodiments, the center panel defines at least one panel recess; and when in the closed position, the left panel and the right panel are at least partially received in the at least one panel recess.

In some embodiments, the vehicle further includes at least one hinge connecting the center panel to the front surface of the tailgate.

In some embodiments, the at least one hinge is connected to a first edge of the center panel, the first edge being disposed nearer a top edge of the tailgate than a second edge of the panel, the second edge being an edge opposite the first edge; and the second edge of the center panel rotates upward and rearward when rotating from the collapsed position to the extended position.

In some embodiments, the at least one hinge is disposed at least partially above the center panel when the tailgate is in the closed position.

In some embodiments, the at least one hinge includes a left hinge including: a first left hinge portion connected to the center panel, and a second left hinge portion connected to the tailgate; and a right hinge including: a first right hinge portion connected to the center panel, and a second right hinge portion connected to the tailgate.

In some embodiments, the at least one hinge includes a male hinge portion including: a cylindrical member, and a non-cylindrical distal end portion integrally formed with the cylindrical member, the distal end portion having a maximum outer diameter greater than an outer diameter of the cylindrical member; and a female hinge portion defines an aperture therein for receiving the male hinge portion, the aperture being non-circular, the aperture being sized and arranged to receive the distal end portion of the male hinge portion therethrough at least one pre-determined relative orientation between the male hinge portion and the female hinge portion; and the aperture is sized and arranged to allow rotation of the cylinder member therein when the cylinder member is disposed in the aperture.

In some embodiments, the distal end portion of the at least one male hinge portion is generally bow-tie shaped; and the aperture of the at least one female hinge portion is generally bow-tie shaped.

In some embodiments, to align the aperture and the distal end portion at the at least one pre-determined relative orientation, the center panel is rotated past vertical.

In some embodiments, the aperture and the distal end portion are not arranged in the at least one pre-determined relative orientation when the cargo box extension assembly is in the collapsed position; and the aperture and the distal end portion are not arranged in the at least one pre-determined relative orientation when the cargo box extension assembly is in the extended position.

In some embodiments, the at least one hinge includes a right hinge and a left hinge; the cylindrical members of the male portions of the right hinge and the left hinge extend in a same direction; and the apertures of the female portions of the right hinge and the left hinge are arranged parallel to each other, such that translation of the center panel, at the at least one pre-determined relative orientation, causes separation of the male hinge portion and the female hinge portion of each of the right hinge and the left hinge thereby separating the cargo box extension assembly from the tailgate.

In some embodiments, the vehicle further includes at least one fastening member for selectively securing the cargo box extension assembly in the collapsed position.

In some embodiments, when the tailgate is in the open position and the cargo box extension assembly is in the extended position, a first cargo area is defined by a plurality of walls of the cargo box and the cargo box extension assembly; when the tailgate is in the closed position, a second cargo area is defined by the plurality of walls of the cargo box and the tailgate; and the first cargo area is greater than the second cargo area.

According to yet another aspect of the present technology, there is provided a method for installing a cargo box extension for a cargo box of a vehicle using a cargo box extension assembly, the cargo box extension assembly including a center panel pivotally connected to the front surface of the tailgate, a left panel pivotally connected to a left side of the center panel, and a right panel pivotally connected to a right side of the center panel. The method includes arranging a tailgate of the cargo box in an open position, a front surface of the tailgate being generally vertical in a closed position and generally horizontal in the open position; rotating the cargo box extension assembly from a generally horizontal position to a generally vertical position, the cargo box extension assembly being pivotally connected to the front surface of the tailgate, in the generally horizontal position, the cargo box extension assembly being at least partially recessed in the tailgate, rotating a distal end of the left panel away from the center panel toward a left wall of the cargo box; connecting the distal end of the left panel to a rear portion of the left wall of the cargo box; rotating a distal end of the right panel away from the center panel toward a right wall of the cargo box; and connecting the distal end of the right panel to a rear portion of the right wall of the cargo box.

In some embodiments, the method further includes removing the cargo box extension assembly from the vehicle including disconnecting the distal end of the left panel from the rear portion of the left wall of the cargo box; rotating the distal end of the left panel away from the left wall toward the center panel; disconnecting the distal end of the right panel from the rear portion of the right wall of the cargo box; rotating the distal end of the right panel away from the right wall toward the center panel; rotating the cargo box extension assembly from the generally vertical position rearward past vertical to a pre-determined relative orientation of at least one female hinge portion and at least one make hinge portion; and translating the cargo box extension assembly horizontally to remove the at least one male hinge portion from the at least one female hinge portion, thereby disconnecting the cargo box extension assembly from the tailgate.

For purposes of the present application, terms related to spatial orientation when referring to a vehicle and components in relation to the vehicle, such as "forwardly", "rearwardly", "left", "right", "top", "bottom", "upper", "lower" "above" and "below", are as they would be understood by a driver of the vehicle sitting therein in an upright driving position, with the vehicle steered straight-ahead.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures may not be drawn to scale.

DETAILED DESCRIPTION

The present technology will be described with reference to a side-by-side (SSV) off-road vehicle 40, but it is contemplated that the present technology could also be applicable to all-terrain vehicles (ATVs) having a cargo box, and any other vehicle having a cargo box.

Figure 1:
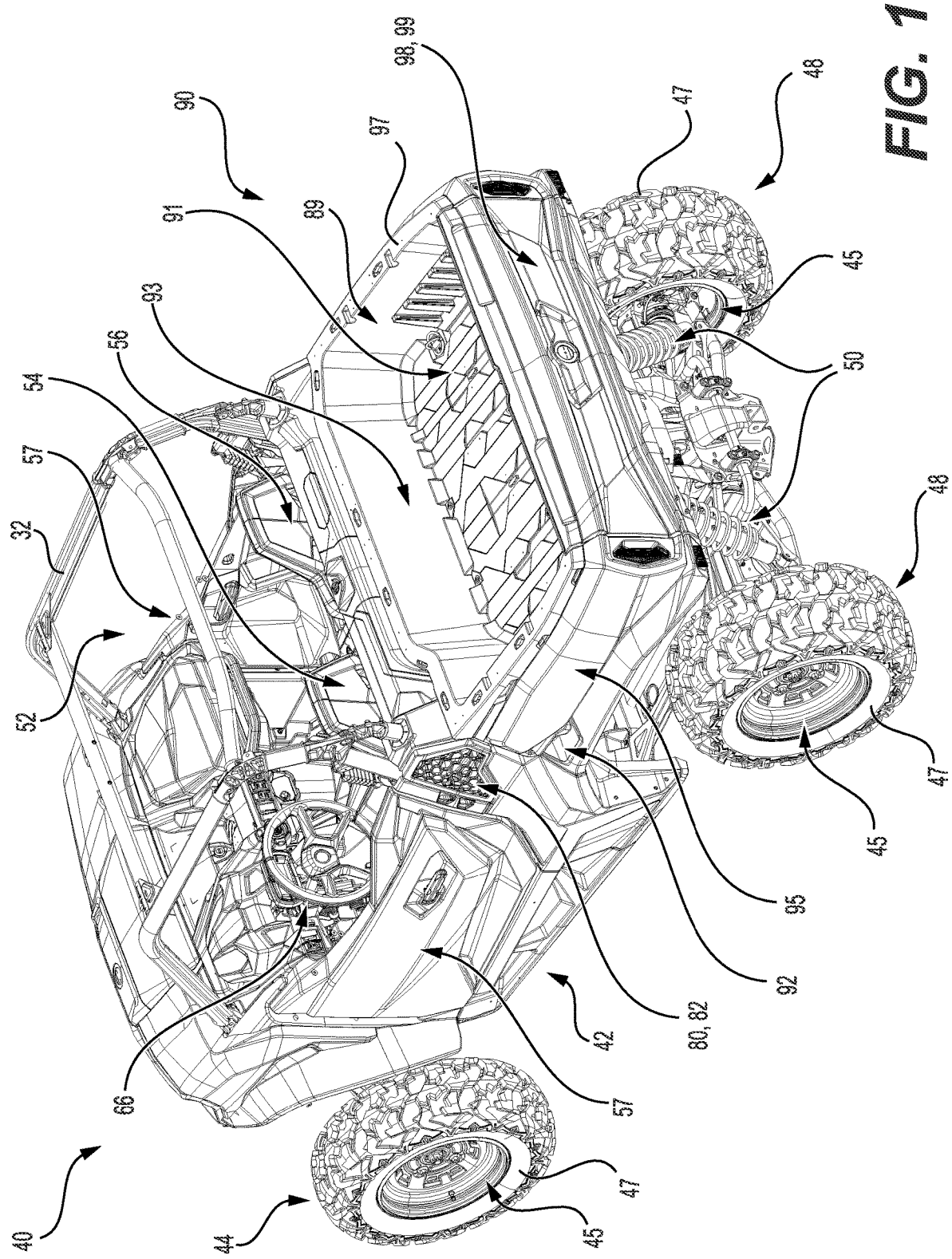
FIG. 1 is a perspective view taken from a top, rear, left side of a side-by-side vehicle (SSV), with a tailgate of a cargo box of the vehicle in a closed position.
Figure 2:
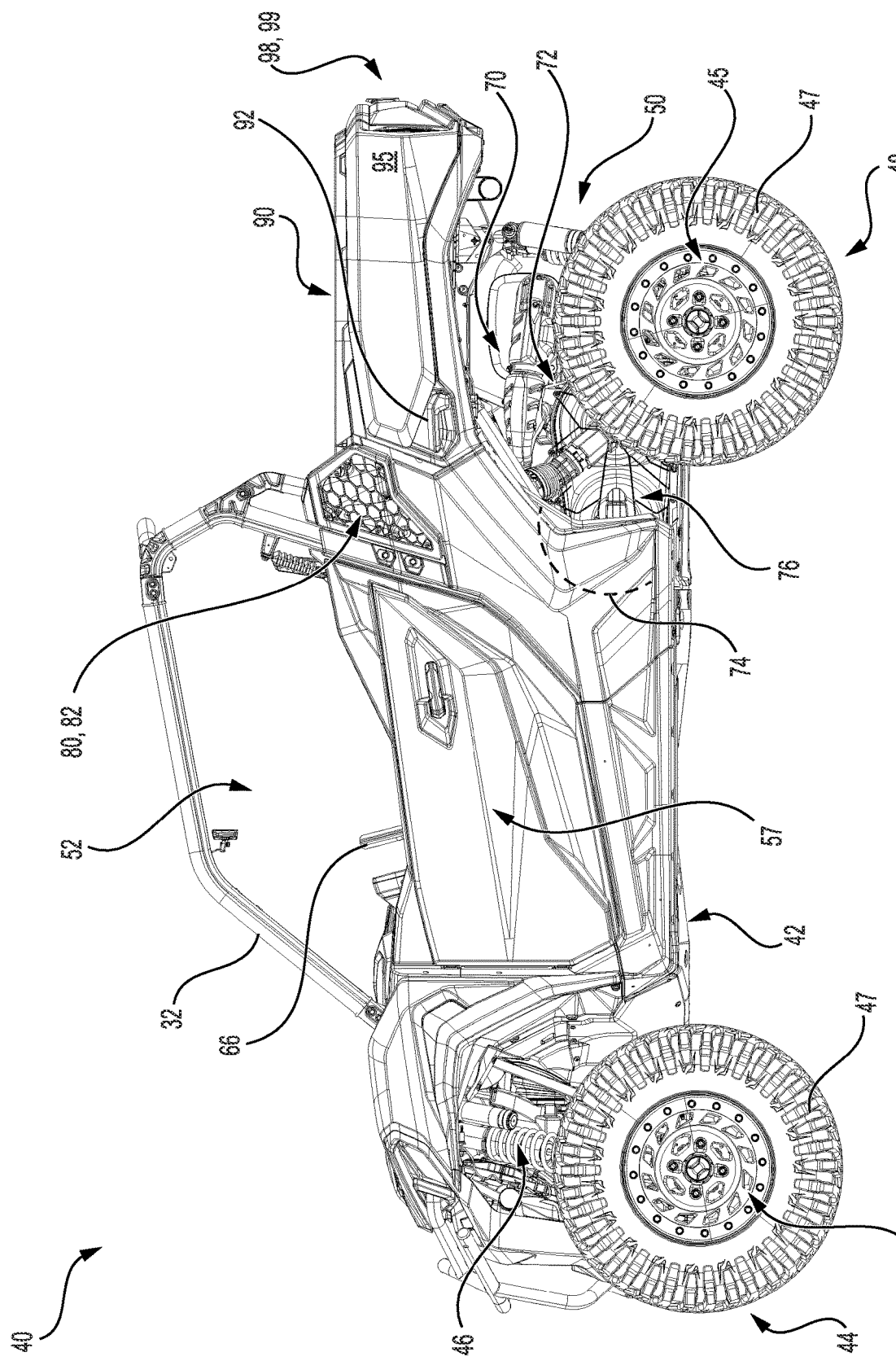
FIG. 2 is a left side elevation view of the vehicle of FIG. 1.

Referring to FIGS. 1 and 2, the has a frame 42 connected to a roll cage 32. The vehicle 40 includes two front wheels 44 connected to a front of the frame 42 by front suspension assemblies 46, and two rear wheels 48 connected to the frame 42 by rear suspension assemblies 50. The suspension assemblies 46, 50 are pivotally connected to the frame 42. Each one of the front and rear wheels 44, 48 has a rim 45 and a tire 47 thereon. The rims 45 and tires 47 of the front wheels 44 may differ in size from the rims and tires of the rear wheels 48. Ground engaging members other than wheels 44, 48 are contemplated for the vehicle 40, such as tracks or skis. In addition, although four ground engaging members are illustrated in the accompanying Figures, the vehicle 40 could include more or fewer than four ground engaging members. Furthermore, different combinations of ground engaging members, such as tracks used in combination with skis, are contemplated.

The frame 42 defines a central cockpit area 52 inside which are disposed a driver seat 54 and a passenger seat 56. The driver seat 54 and the passenger sat 56 are arranged side-by-side, forming one row of seating. In the present embodiments, the driver seat 54 is disposed on a left side of the vehicle 40 and the passenger seat 56 is disposed on a right side of the vehicle 40. It is contemplated that the driver seat 54 could be disposed on the right side of the vehicle 40 and that the passenger seat 56 could be disposed on the left side of the vehicle 40. In some embodiments, the row seating could be instead formed by one bench seat, wherein the driver seat 54 and the passenger seat 56 could be portions of a bench seat further including a central seat portion. It is also contemplated that the vehicle 40 could also include a second row of seats, with two side-by-side seats or a bench seat. The vehicle 40 includes two doors 57 to provide access to the cockpit area 52 and the seats 54, 56.

A steering wheel 66 is disposed in front of the driver seat 54. The steering wheel 66 is used to turn the front wheels 44 to steer the vehicle 40. The frame 42 also defines a power pack area 70 rearward of the cockpit area 52. A power pack 72 is connected to the frame 42 in the power pack area 70. The power pack 72 includes a motor 74, specifically an internal combustion engine 74 (schematically shown in FIG. 2) connected to a continuously variable transmission (CVT) 76 disposed on a left side of the engine 74. The CVT 76 is on the driver side (left side) of the vehicle 40. The CVT 76 is operatively connected to the front wheels 44 by a front prop shaft and differential (not shown) and to the rear wheels 48 by a transaxle (not shown) to transmit torque from the engine 74 to the front and rear wheels 44, 48 to propel the vehicle 40. It is contemplated that a dual clutch transmission could be used instead of a CVT, as well as other known automatic, semiautomatic or manual transmission and sub-transmissions.

An engine control unit (ECU) (not shown) electronically controls different parameters and operating conditions of the engine 74 and of several components of the power pack 72. The power pack 72 also includes an air intake system 80 operatively connected to power pack 72. Air intake grilles 82 are provided on either sides of the vehicle 40, rearward of the cockpit area 52. In the present embodiment, the left air intake grille 82 provides air to the CVT 76, and the right air intake grille (not shown) provides air to the engine 74. In other implementations, the power pack 72 could include at least one electric motor, power electronics module and a battery pack in replacement of or in complement of the internal combustion engine 74.

The vehicle 40 further includes a cargo box 90 disposed above the power pack area 70 and rearward of the seats 54, 56. The cargo box 90 is pivotally connected to the frame 42 and is pivotable between at least a lowered position (shown in FIGS. 1 and 2) and a raised position (not shown). Levers 92 are provided on the left and right sides of the cargo box 90 (only the left lever 92 being illustrated) and are connected to a cargo box lock (not shown) for maintaining the tailgate 99 in the closed position when locked.

Figure 3:
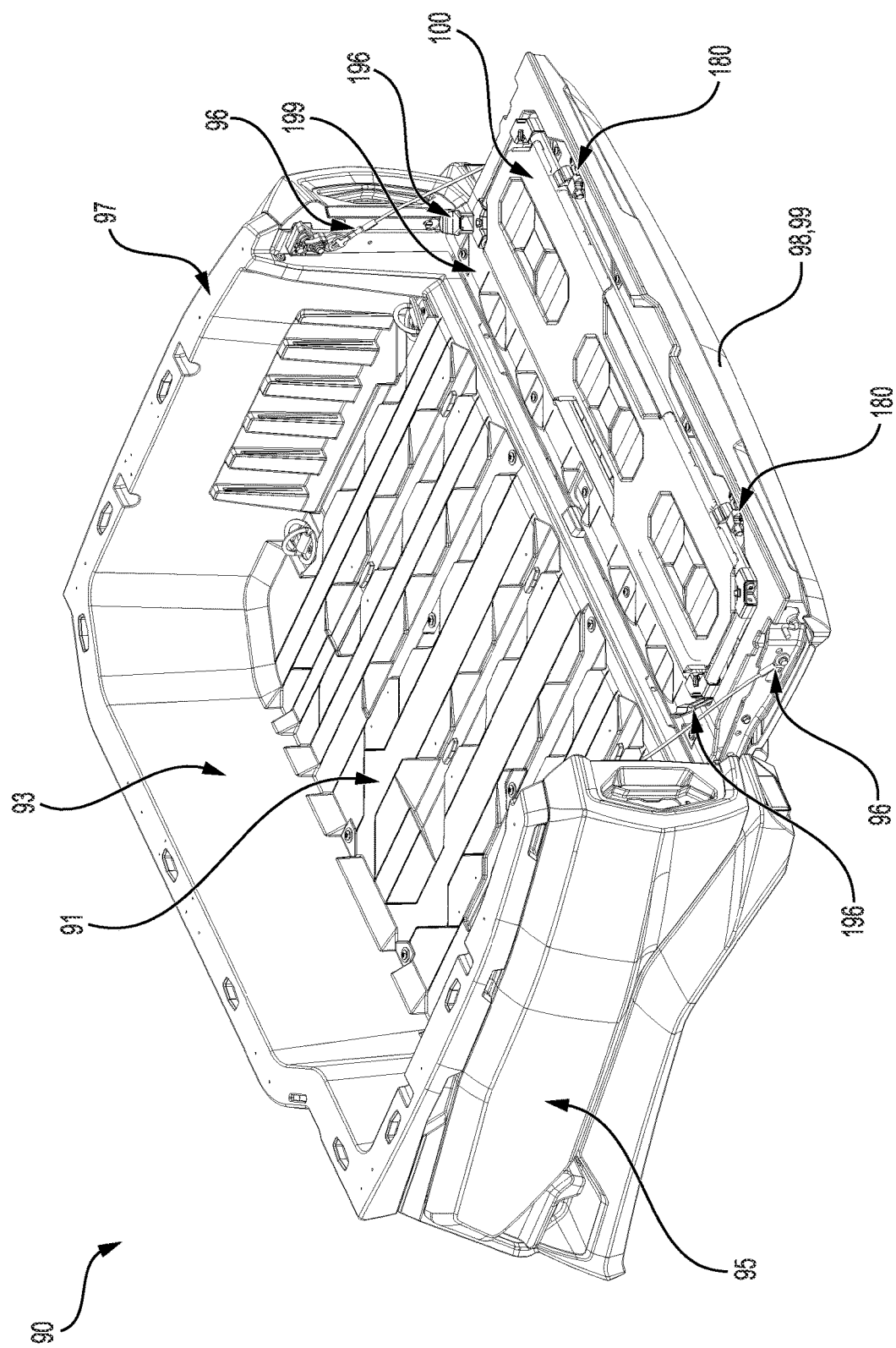
FIG. 3 is a perspective view taken from a top, rear, left side of the cargo box of the vehicle of FIG. 1, with the tailgate in an open position and a cargo box extension assembly in a collapsed position.
Figure 4:
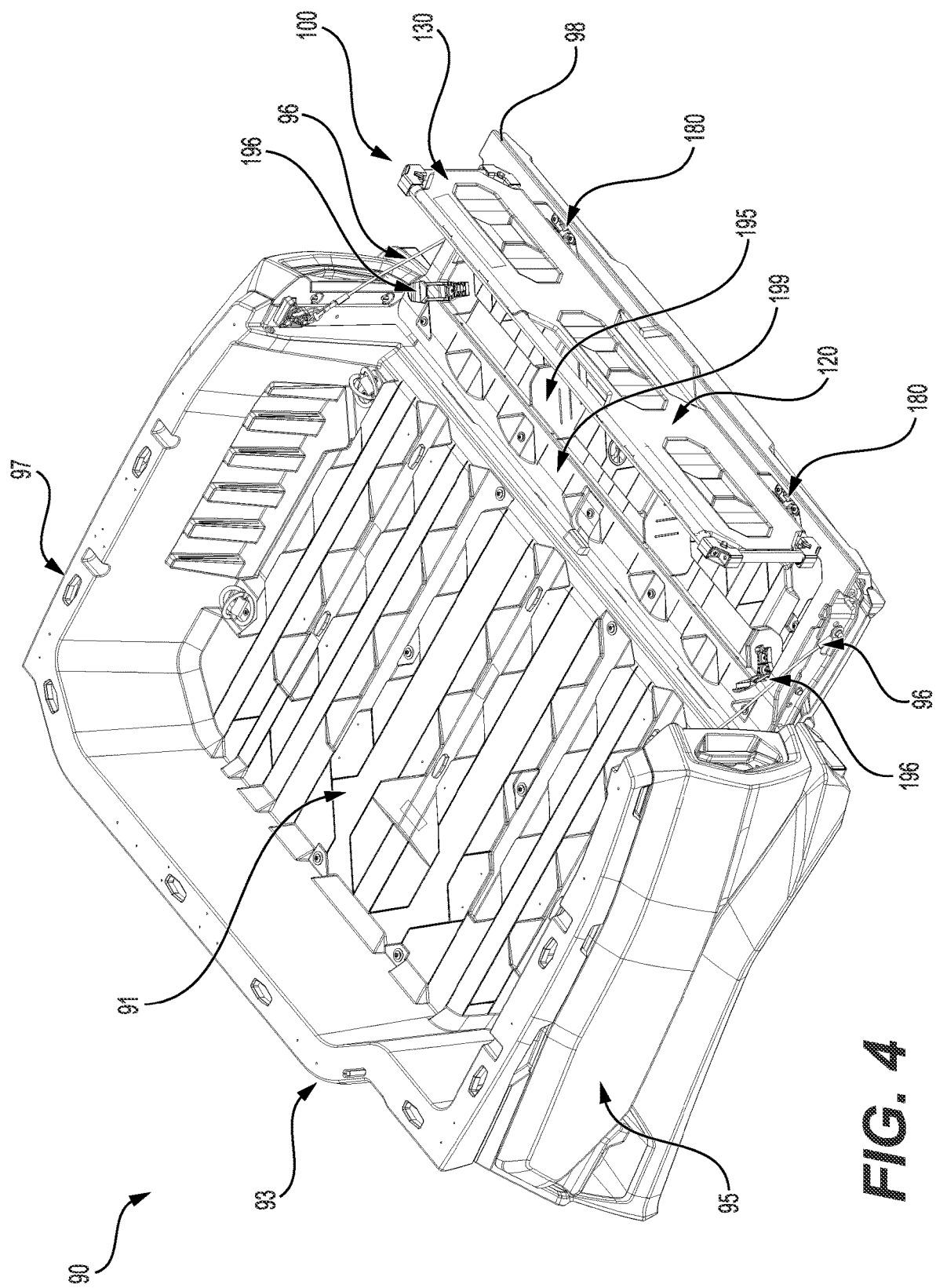
FIG. 4 is the perspective view of the cargo box of FIG. 3, with the tailgate in the open position and the cargo box extension assembly in a partially extended position.
Figure 5:
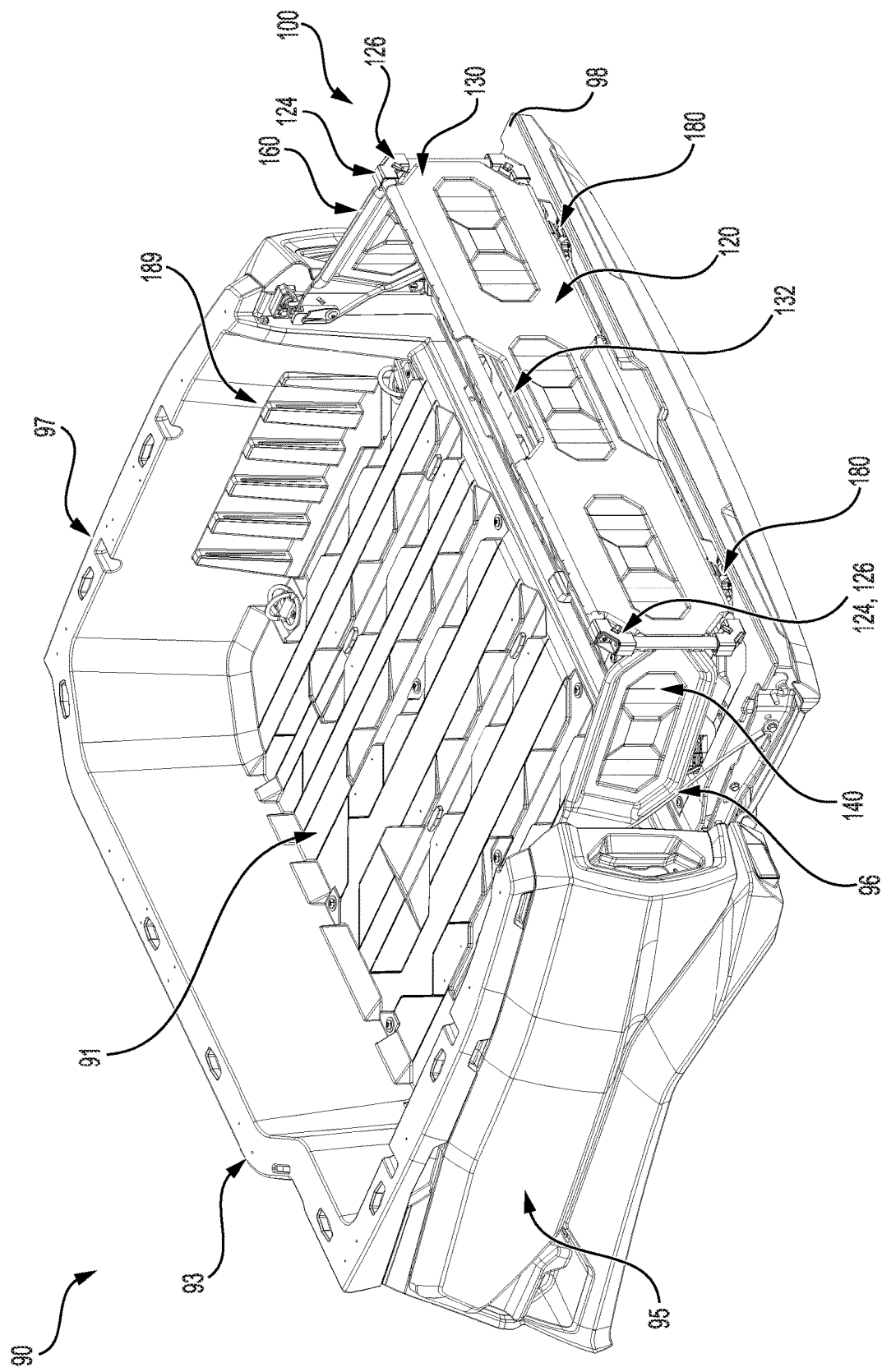
FIG. 5 is the perspective view of the cargo box of FIG. 3, with the tailgate in the open position and the cargo box extension assembly in an extended position.

With additional reference to FIGS. 3 to 5, the cargo box 90 has a box floor 91. A front wall 93 extends upwardly from a front end of the floor 91. A left side wall 95 extends upwardly from a left side of the floor 91. A right side wall 97 extends upwardly from a right side of the floor 91. In the illustrated embodiment, the front wall 93, the left side wall 95, and the right side wall 95 are all integrally connected, but this may not be the case for all embodiments.

Figure 6:
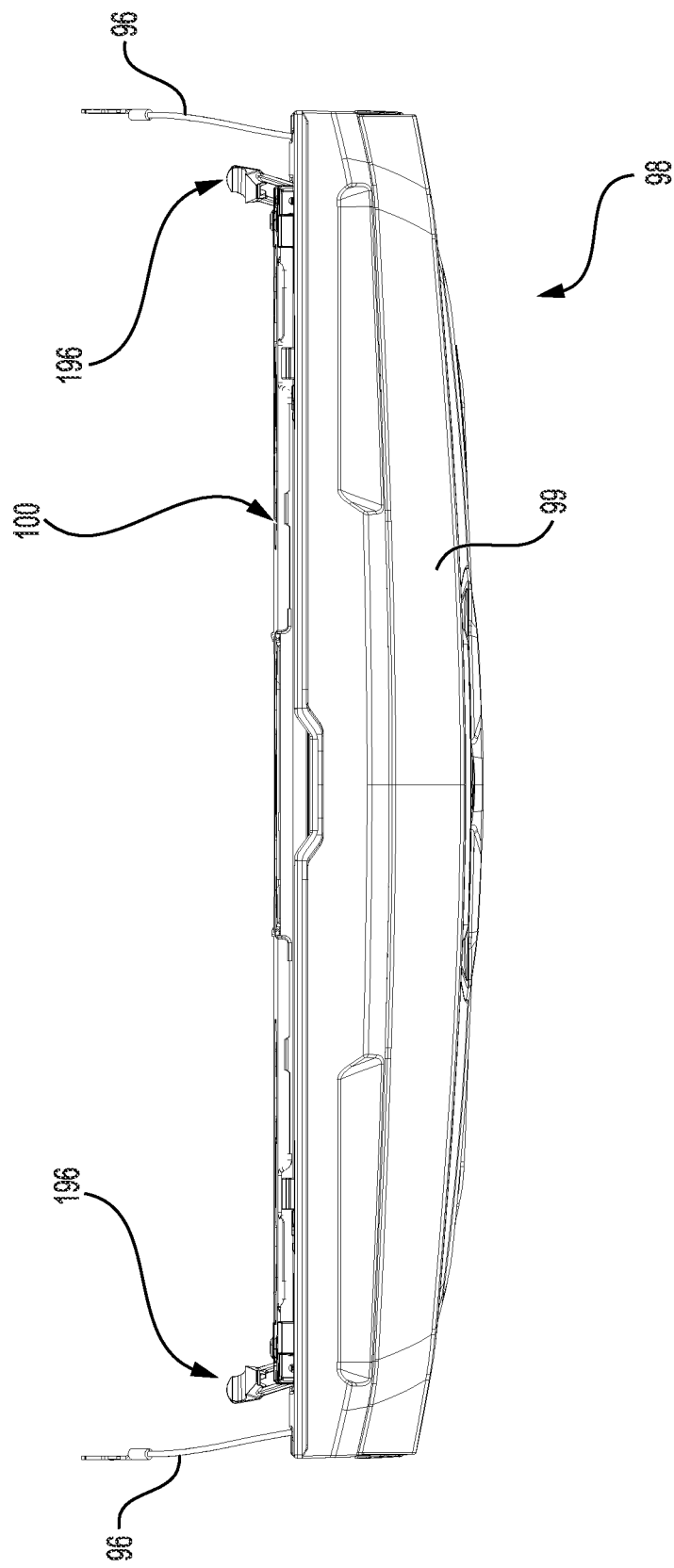
FIG. 6 is a rear elevation view of a tailgate assembly of the vehicle of FIG. 1, shown in an open position.
Figure 7:
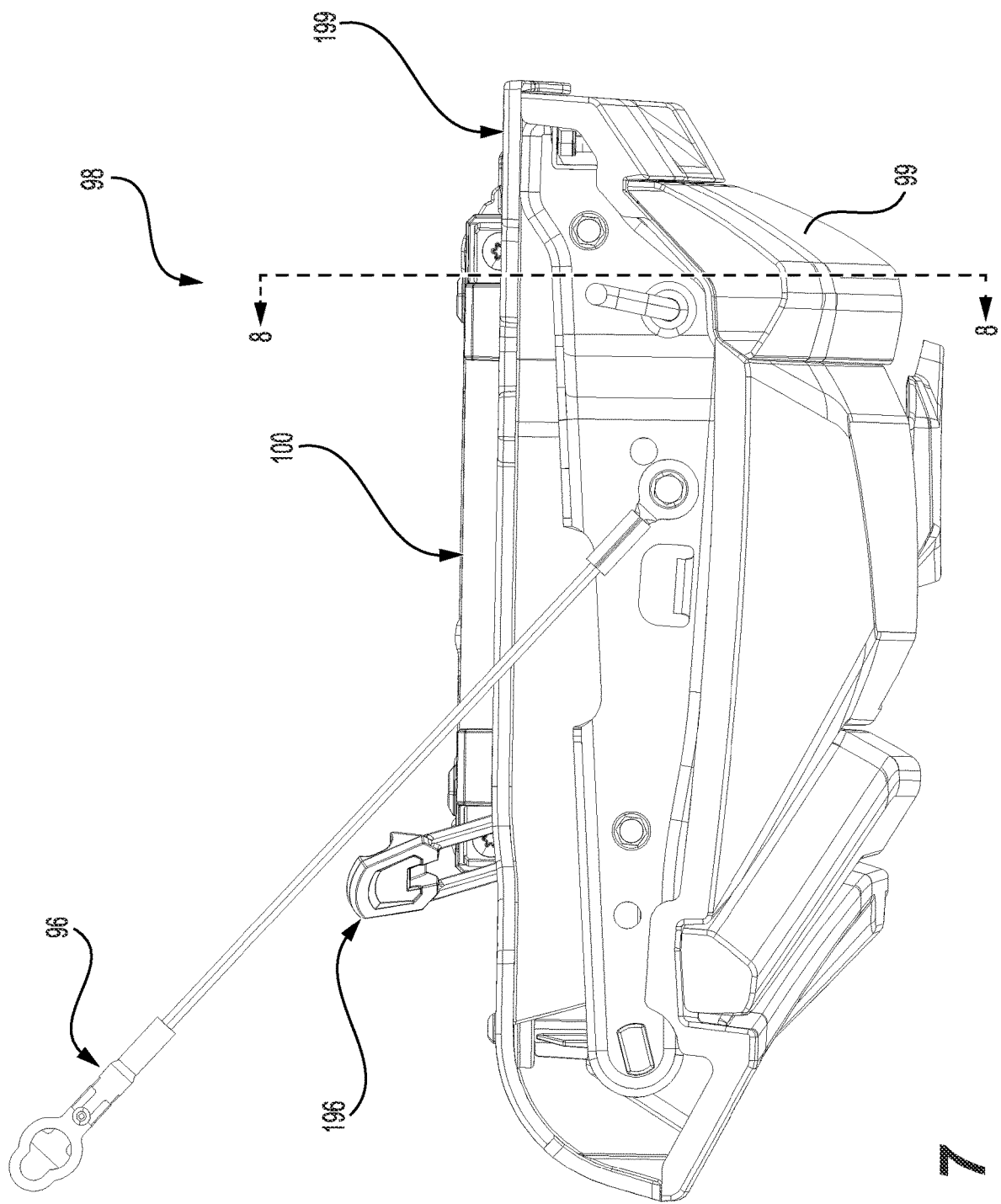
FIG. 7 is a left side elevation view of the tailgate assembly of FIG. 6.
Figure 8:
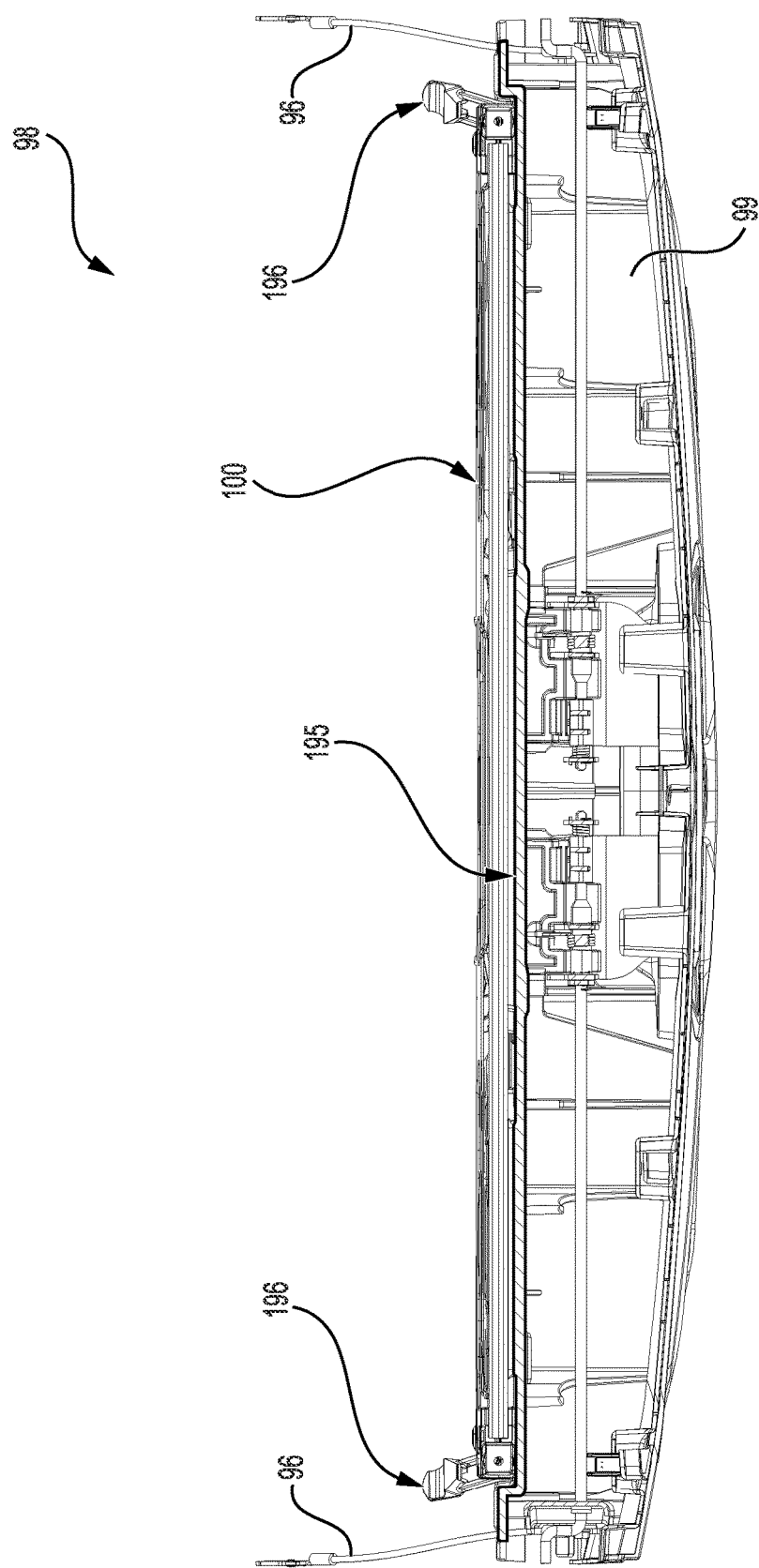
FIG. 8 is a cross-sectional view of the tailgate assembly of FIG. 6, taken along line 8-8 of FIG. 7.

The cargo box 90 further includes a tailgate assembly 98. The tailgate assembly 98 includes a tailgate 99 pivotally connected to the cargo box floor 91. The tailgate 99 is selectively rotatable between a closed position (FIGS. 1 and 2) and an open position (FIGS. 3 to 5) for selectively closing the cargo box 90. The tailgate assembly 98 is further illustrated in isolation, with the tailgate 99 in the open position, in FIGS. 6 to 8. The cargo box 90 further includes two straps 96 to prevent the tailgate 99 from rotating downward past the open position, although this may be achieved differently in difference embodiments. The cargo box 90 has a cargo area 89 (see FIG. 1) defined by the walls 93, 95, 97 of the cargo box 90 and the tailgate 99, when in the closed position.

The tailgate 99 has a front surface 199, the designation "front" simply being defined by the arrangement of the surface 199 when the tailgate 99 is in the closed position. When the tailgate 99 is in the closed position, the front surface 199 is arranged generally vertically and faces forward (i.e. a normal to the surface 199 points toward a front of the vehicle 40). When the tailgate 99 is in the open position, the front surface 199 is arranged generally horizontally and faces upward (i.e. the normal to the surface 199 points upward).

The tailgate assembly 98 also includes a cargo box extension assembly 100, also referred to herein as the assembly 100, for selectively increasing the cargo area defined within the cargo box 90. The assembly 100 is selectively and pivotally connected to the tailgate 99 on the surface 199.

Figure 9:
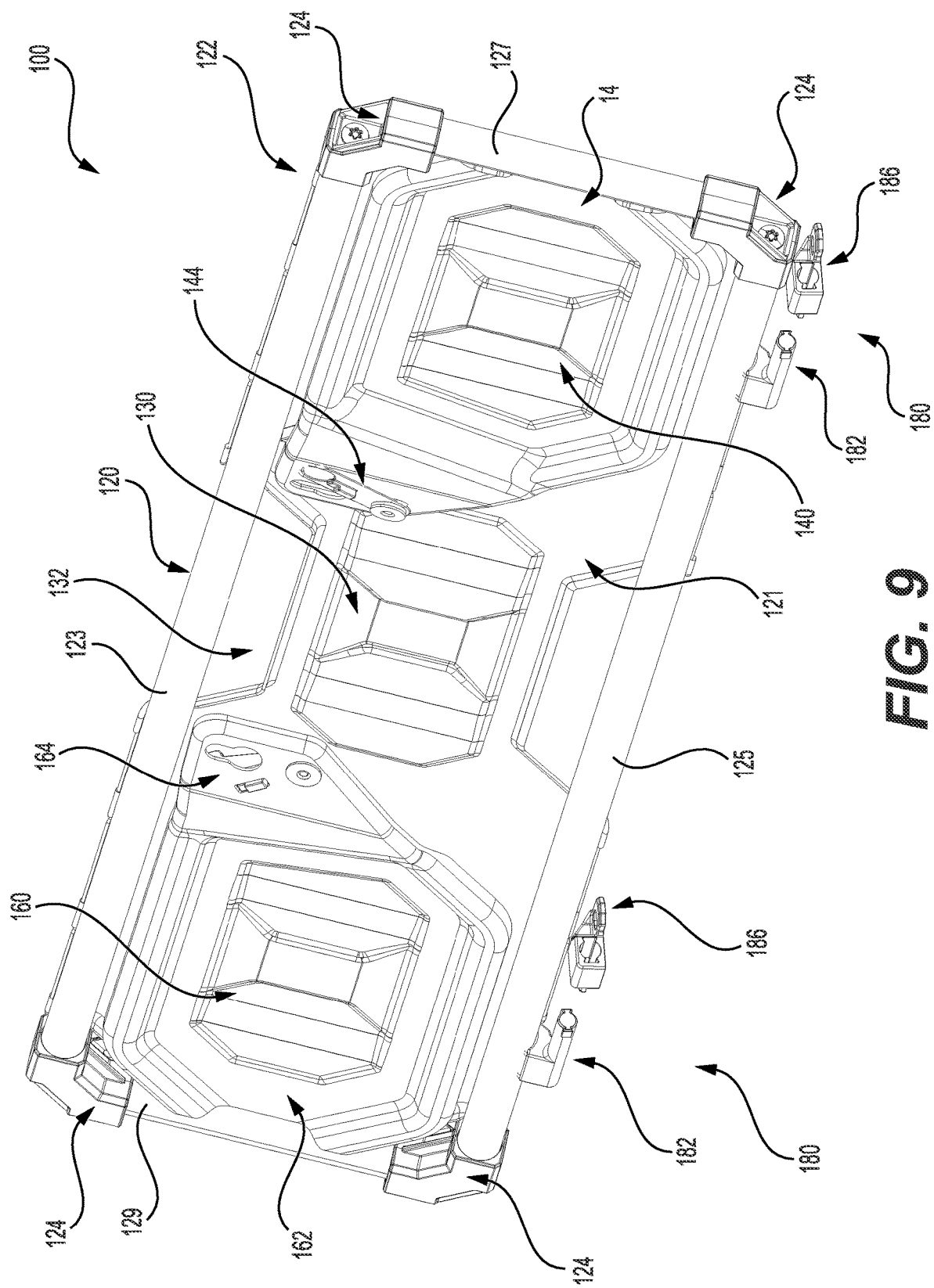
FIG. 9 is a front, left side perspective view of the cargo box extension assembly of FIG. 3.
Figure 10:
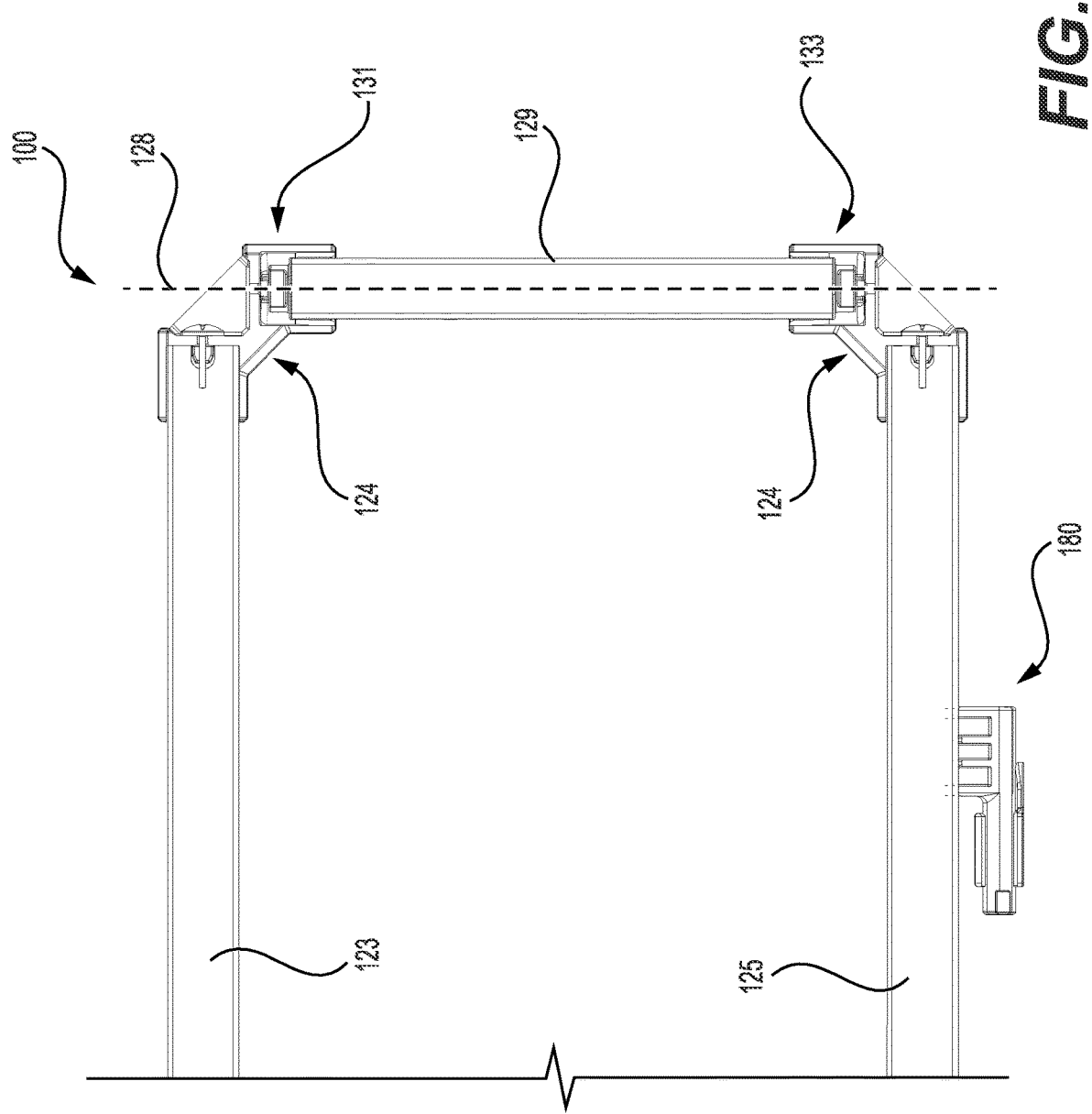
FIG. 10 is a cross-sectional view of a portion frame of the cargo box extension assembly of FIG. 9.
Figure 11:
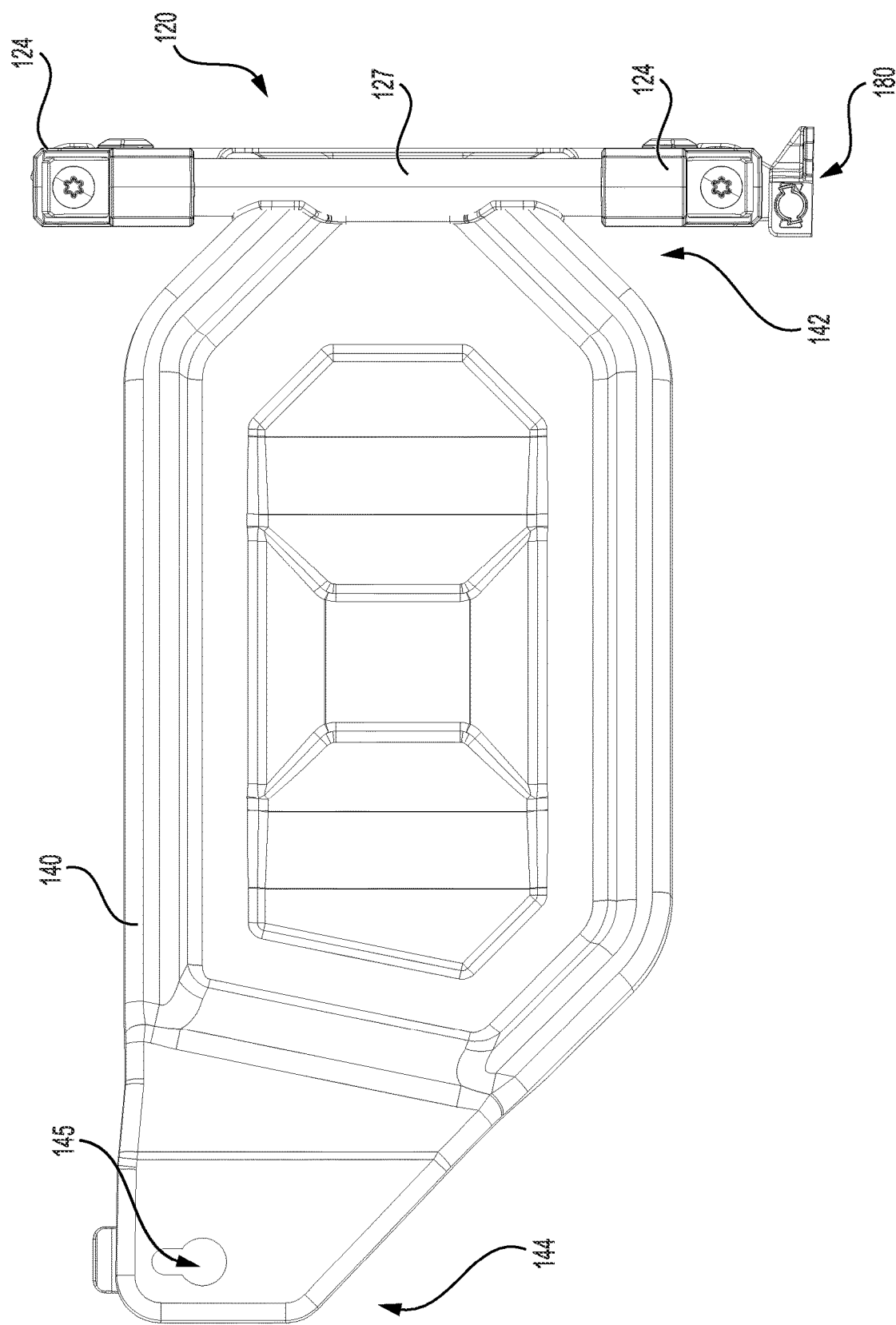
FIG. 11 is a left side elevation view of the cargo box extension assembly of FIG. 9, with a left panel in an open position.

With additional reference to FIGS. 9 to 11, the assembly 100 includes a center panel 120 pivotally connected to the front surface 199. The center panel 120 extends laterally (left to right) across the tailgate 99, generally parallel to the front wall 93 (when connected to the tailgate 99). The assembly 100 also includes a left panel 140 pivotally connected to a left end portion of the center panel 120 at a first end 142 of the left panel 140. The assembly 100 further includes a right panel 160 pivotally connected to a right end portion of the center panel 120 at a first end 162 of the right panel 160. Connection of the left and right panels 140, 160 is described in more detail below.

Figure 12:
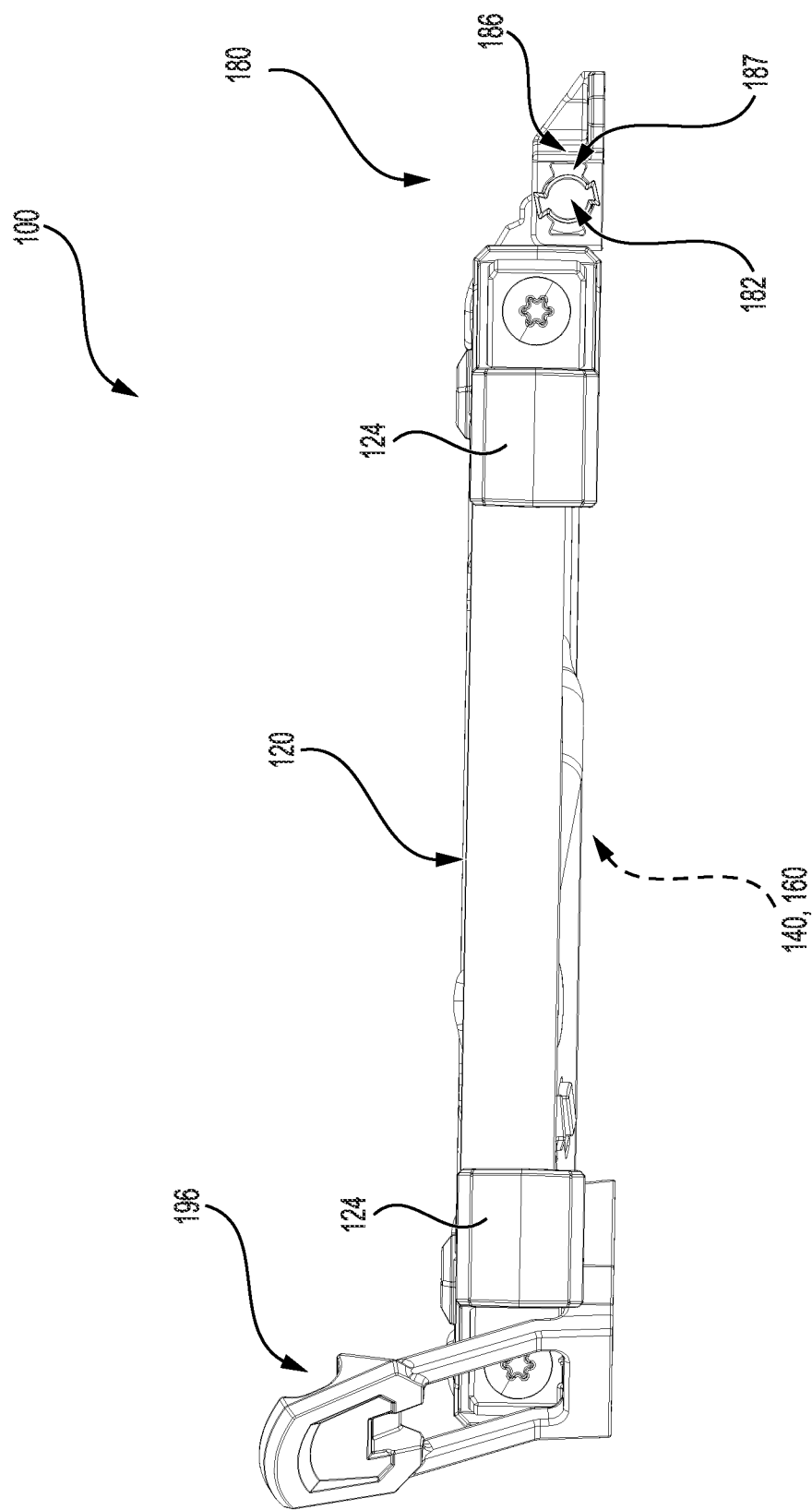
FIG. 12 is a left side elevation view of the cargo box extension assembly of FIG. 9, with the assembly in a collapsed position.

A distal end 144, 164 of the each of the left and right panels 140, 160 is configured for selectively connecting to a corresponding rear portion of the cargo box 90. Each of the left and right panels 140, 160 is rotatable between at least a closed position (see also FIGS. 4, 12, and 13) and an open position (FIG. 5). In the open position of the panels 140, 160, the distal end 144, 164 of each panel 140, 160 is rotated outward away from the center panel 120 to a corresponding one of the left and right side walls 95, 97. In the closed position, the distal end 144, 164 of each panel 140, 160 is rotated inward toward the center panel 120, where each panel 140, 160 is arranged generally parallel to the center panel 120 and is aligned with each other. Although not illustrated herein, it is contemplated that one or more means for maintaining the panels 140, 160 in the closed position could be included in the assembly 100. As will be described in more detail below, the panels 140, 160 are folded into the center panel 120 when in the closed position.

The cargo box extension assembly 100, when installed on the tailgate 99, is selectively movable between a collapsed position and an extended position. The assembly 100 is also movable to a separation position, as will be described further below. In the collapsed position, illustrated in FIGS. 3, 6, and 13 to 17, the left and right panels 140, 160 are arranged in the closed position and the center panel 120 is arranged generally parallel to the front surface 199 of the tailgate 99. As will be described further below, the assembly 100 is also received in a recess 195 of the tailgate 99 in the collapsed position. When the assembly 100 is in the collapsed position, the tailgate 99 can be in the open position, the closed position, or moved therebetween.

In the extended position, illustrated in FIG. 5, the assembly 100 is arranged to selectively close a rear of the cargo box 90 with the tailgate 99 in the open position. An extended cargo area 189 is defined by the walls 93, 95, 97 of the cargo box 90 and the assembly 100 in the extended position. As can be seen by comparing FIGS. 1 and 5, a distance from the front wall 93 of the cargo box 90 to the extended assembly 100 is greater than a distance from the front wall 93 of the cargo box 90 to the closed tailgate 99. The extended cargo area 189 is thus greater than the cargo area 89 of the cargo box 90 with the tailgate 99 in the closed position.

In the extended position of the assembly 100, the tailgate is arranged in the open position, the center panel 120 is arranged generally perpendicular to the front surface 199 of the tailgate 99, and each of the left and right panels 140, 160 are arranged in the open position. As will be described in more detail below, the distal end 144, 164 of each panel 140, 160 is also selectively connected to a corresponding wall 95, 97 of the cargo box 90 to secure the panels 140, 160 in place. This also further aids in maintaining the assembly 100 in the extended position.

In FIG. 4, the assembly 100 is also shown in a partially extended position, where the center panel 120 has been pivoted up and away from the tailgate 99, but the left and right panels 140, 160 are each still in the closed position. While in the present embodiment the assembly 100 does not generally remain in a partially extended position without addition measures to maintain its position, it is contemplated that different embodiments could be configured to have additional stable positions. It is also contemplated that the present and/or additional embodiments could be arranged in a partially extended position, with one of the panels 140, 160 in the open position and connected to the corresponding wall 95, 97 with the other one of the panels 140, 160 in the closed position.

With reference to FIGS. 9 and 10, the center panel 120 includes a frame 122 formed from four rigid members. The members making up the frame 122 include a top member 123, a bottom member 125, a left member 127, and a right member 129. The members 123, 125, 127, 129 (as well as the frame 122 generally) are identified using their relative arrangement when the assembly 100 is in the extended position for ease of identification; these labels are not meant to be limiting. It should be noted, for example, that the top member 123 is vertically lower than the bottom member 125 when the assembly 100 is in the collapsed position and the tailgate 99 is in the closed position.

The frame 122 further includes four corner brackets 124 connecting the members together 123, 125, 127, 129. The top member 123 is fastened to a top, left bracket 124 and a top, right bracket 124. The bottom member 125 is fastened to a bottom, left bracket 124 and a bottom, right bracket 124.

The left member 127 is pivotally connected to the top, left bracket 124 and the bottom, left bracket 124 and the right member 129 is pivotally connected to the top, right bracket 124 and the bottom, right bracket 124. As is illustrated for the right member 129 in FIG. 10, a top end 131 and a bottom end 133 of each side member 127, 129 is received in corresponding ones of the brackets 124. A protrusion of each end 131, 133 is received in a slot in the bracket 124, such that each member 127, 129 is free to swivel in the bracket 124 about an axis 128. A portion of the bracket 124 extends over the end portions of each member 127, 129 further aiding in maintaining the members 127, 129 in the brackets 124.

As is described above, the left and right panels 140, 160 are rotatably connected to the center panel 120. Specifically, the first end 142 of the left panel 140 is connected to the left member 127 and the first end 162 of the right panel 160 is connected to the right member 129. In the present embodiment, the panels 140, 160 are metal panels welded to the members 127, 129. It is contemplated, however, that the material of the panels 140, 160 and/or the manner in which the panels 140, 160 are connected to the members 127, 129 could vary.

The center panel 120 also includes a wall portion 130, also referred to as the wall 130, connected to the frame 122. The wall 130 is connected to the top and bottom members 123, 125. In the present embodiment, the wall 130 is a metal plate welded to the top and bottom members 123, 125. In some embodiments, the wall 130 could be formed from different materials (e.g. plastic) and/or differently connected to the frame 122. The left and right members 127, 129 are not connected to the wall 130 so as to be allowed to rotate as described above. The wall 130 defines an opening 132 therein, at a top, middle portion of the wall 130. The opening 132 allows an operator to grasp a center portion of the top member 123 to move the assembly 100 between the extended and collapsed positions, the operator passing their hand at least partially through the opening 132 to grasp the member 123.

As can be seen FIGS. 5 and 9, the wall portion 130 is connected to a rear side of the members 123, 125. In this way, the center panel 120 defines a panel recess 121, the recess 121 being defined on a rear side by a front side of the wall portion 130 and between the frame members 123, 125, 127, 129. When rotating the left and right panels 140, 160 inward to the closed position, the panels 140, 160 are received in the recess 121. As can also be seen in FIGS. 12 and 13, the panels 140, 160 are arranged to be received in the space formed by the frame 122 (i.e. the recess 121) such that the assembly 100 in the collapsed position lies flat and occupies generally the same space required for the center panel 120.

Figure 14:
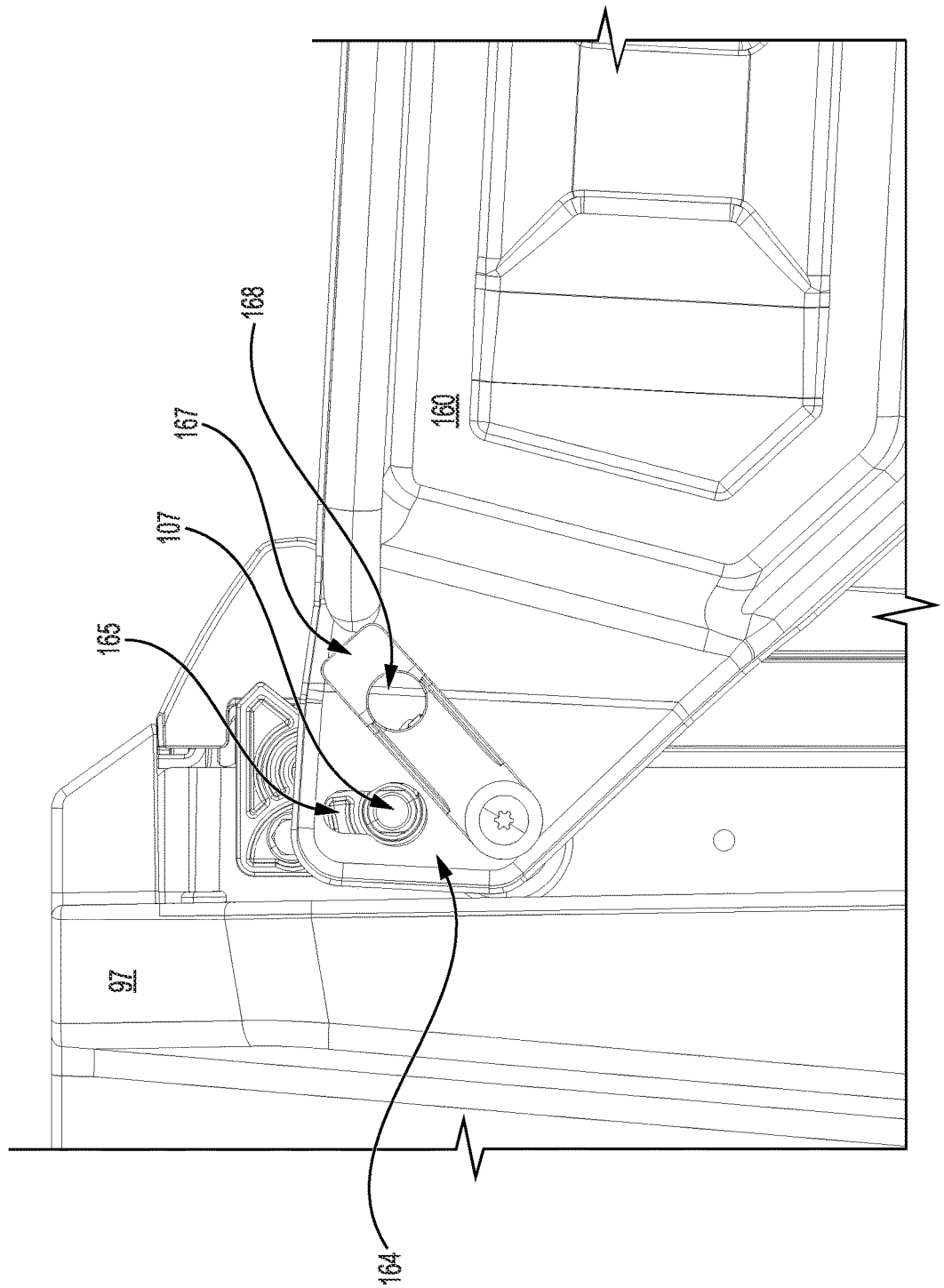
FIG. 14 is a left side elevation view of a portion of a right panel of the cargo box extension assembly of FIG. 9 and a portion of a right wall of the cargo box of the vehicle of FIG. 1, in a first partially connected position.
Figure 15:
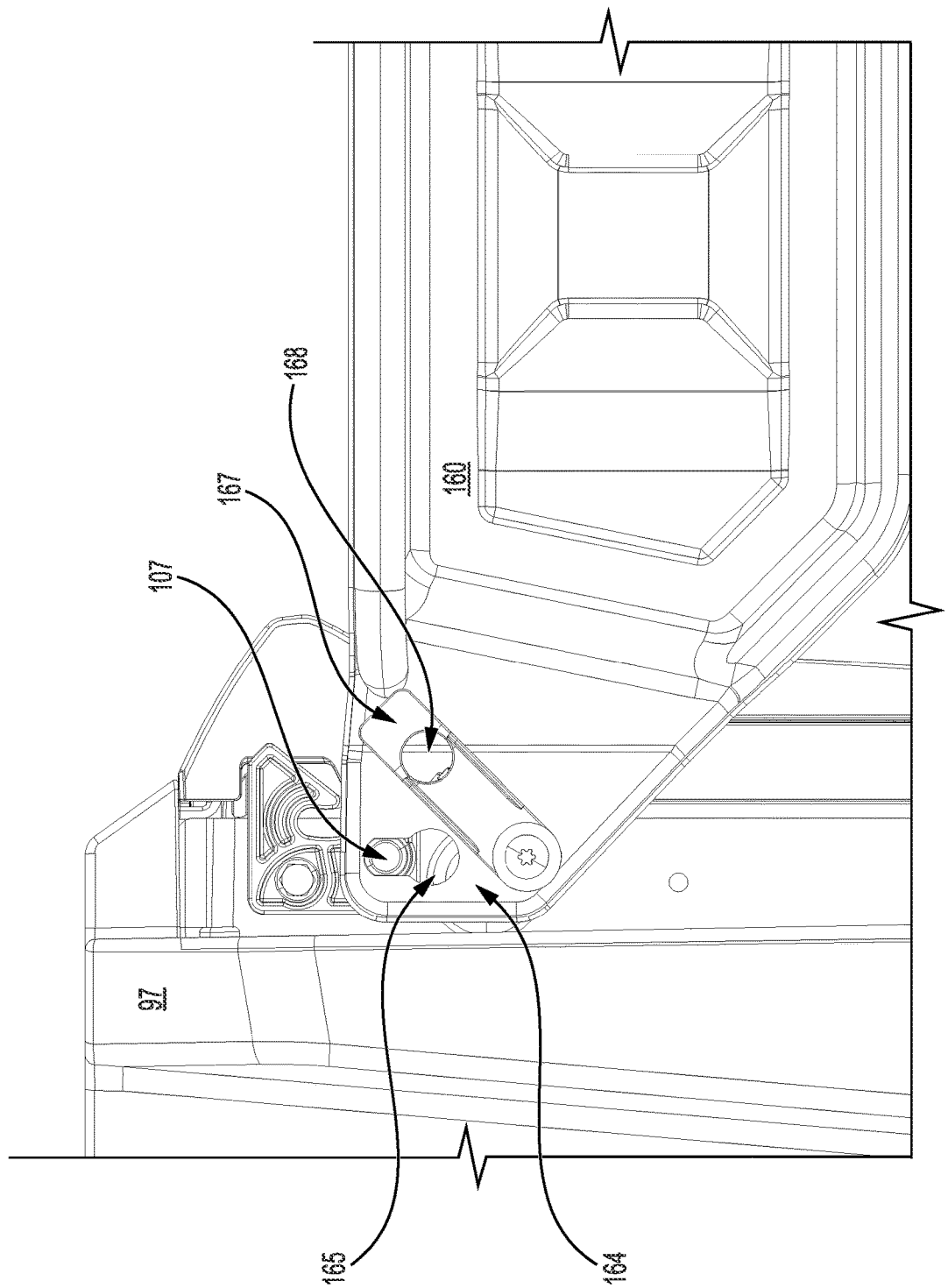
FIG. 15 is the left side elevation view of the portion of the right panel of the cargo box extension assembly and the portion of the right wall of the cargo box of FIG. 14, in a second partially connected position.
Figure 16:
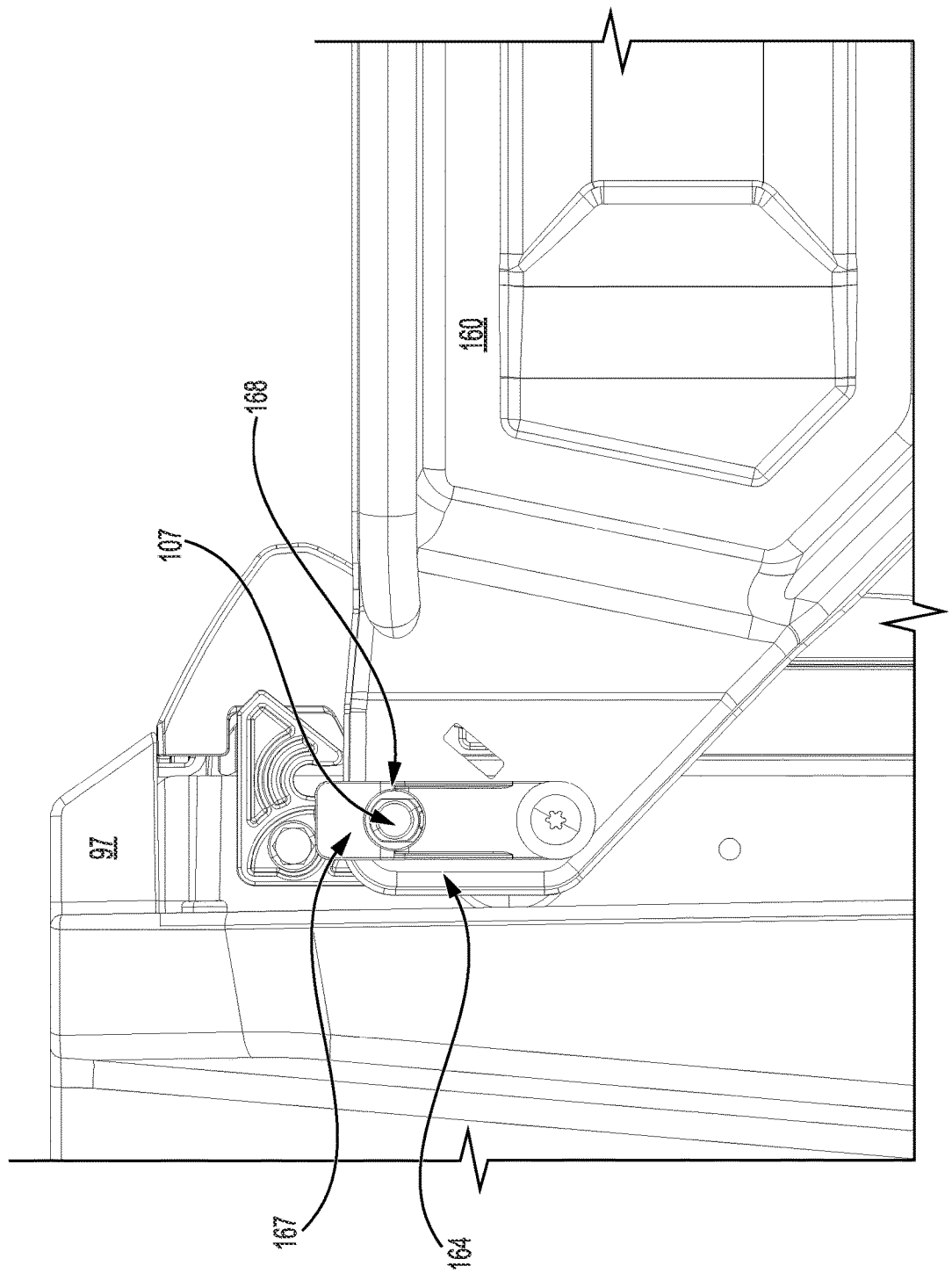
FIG. 16 is the left side elevation view of the portion of the right panel of the cargo box extension assembly and the portion of the right wall of the cargo box of FIG. 14, in a connected position.

The panels 140, 160, when the assembly 100 is in the extended position, are selectively connected to rear portions of the left and right walls 95, 97 of the cargo box 90. With reference to FIGS. 14 to 16, the left panel 140 has an aperture 145 defined therein and the right panel 160 has an aperture 165 defined therein. Each aperture 145, 165 is sized and arranged to receive therein a post 107 extending inward from a corresponding one of the left and right walls 95, 97 (only the post 107 on the right wall 97 being shown). The apertures 145, 165 are each larger at a bottom portion than a top portion and the post 107 has a distal end with a larger diameter than its central portion. Each panel 140, 160 also includes a flexible tab 167 (only the flexible tab 167 of the right panel 160 being shown). Each flexible tab 167 is pivotally connected to the corresponding panel 140, 160, below the aperture 145, 165. Each flexible tab 167 includes an aperture 168 sized and arranged for being press-fit over the post 107.

To connect the right panel 160 to the right wall 97, the right panel 160 is first pivoted to the right wall 97 and the post 107 is inserted through the larger bottom portion of the aperture 165 (FIG. 14). In some cases, the panel 160 may need to be pivoted slightly upward relative to the wall 97 to insert the post 107. The distal end 164 of the panel 160 is then adjusted slightly downward to pass the smaller upper portion of the aperture 165 over the post 107, behind the wider distal portion of the post 107 (FIG. 15). The flexible tab 167 is then pivoted to align the aperture 168 with the post 107 and then press-fit over the distal end of the post 107 (FIG. 16). In this way, the panels 140, 160 are secured in the open position. It is also contemplated that different means could be used to maintain the panels 140, 160 in the open position when the assembly 100 is in the extended position. The same procedure is followed to connect the left panel 140 to the left wall 95, mutatis mutandis.

Returning to FIGS. 6 to 8 and as is mentioned briefly above, the assembly 100, when in the collapsed position, is received in the recess 195 of the front surface 199. In the present embodiment, the recess 195 is less deep than a total thickness of the collapsed assembly 100, a portion of the assembly 100 extending slightly beyond the surface 199. It is contemplated that the recess 195 could be deeper or shallower in different embodiments. The recess 195 aids in storing away the assembly 100 when not in use. As a portion of the assembly 100 is receded into the tailgate 99 inward of the front surface 99, cargo can be moved into and out of the cargo box 90 with less interference from the assembly 100 when in the collapsed position, without requiring the assembly 100 to be removed from the vehicle 40. This arrangement also allows the assembly 100 to be stored in the vehicle 40 when not in use, while occupying only a small amount of space in the cargo area 89.

As is described above, the assembly 100 is pivotally connected to the surface 199 of the tailgate 99. Returning to FIGS. 9, 12, and 13 and with additional reference to FIG. 17, the assembly 100 is selectively connected to the tailgate 99 by two hinges 180, specifically a left hinge 180 and a right hinge 180. In some embodiments, it is contemplated that more or fewer hinges could be used to connect the assembly 100 and the tailgate 99.

As can be seen in FIGS. 3 to 5, the hinges 180 are disposed near a top edge of the tailgate 99 and thus are generally disposed above the center panel 120 when the tailgate 99 is in the closed position. In this way, when the assembly 100 is rotated upward and rearward to the extended, generally vertical position, the extended cargo area 189 includes most of the area of the tailgate 99, with the front surface 199 acting as an extended portion of the cargo box floor 91. By positioning the hinges 180 above the assembly 100 when in the collapsed position and when the tailgate 99 in the closed position, the assembly 100 is also generally maintained in the recess 195 by gravity.

Figure 17:
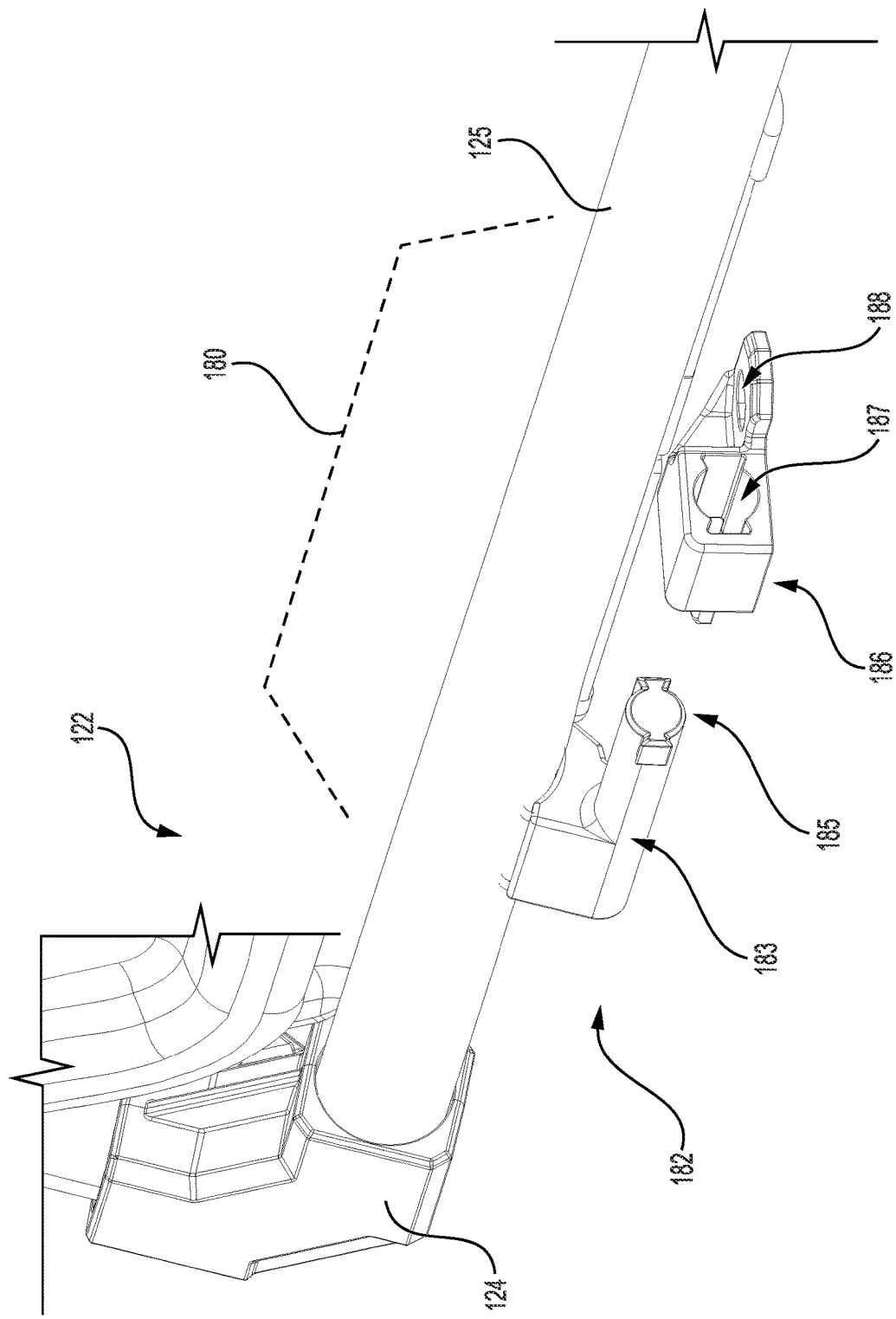
FIG. 17 is a close-up, front, left side perspective view of a hinge of the cargo box extension assembly of FIG. 9.
Figure 18:
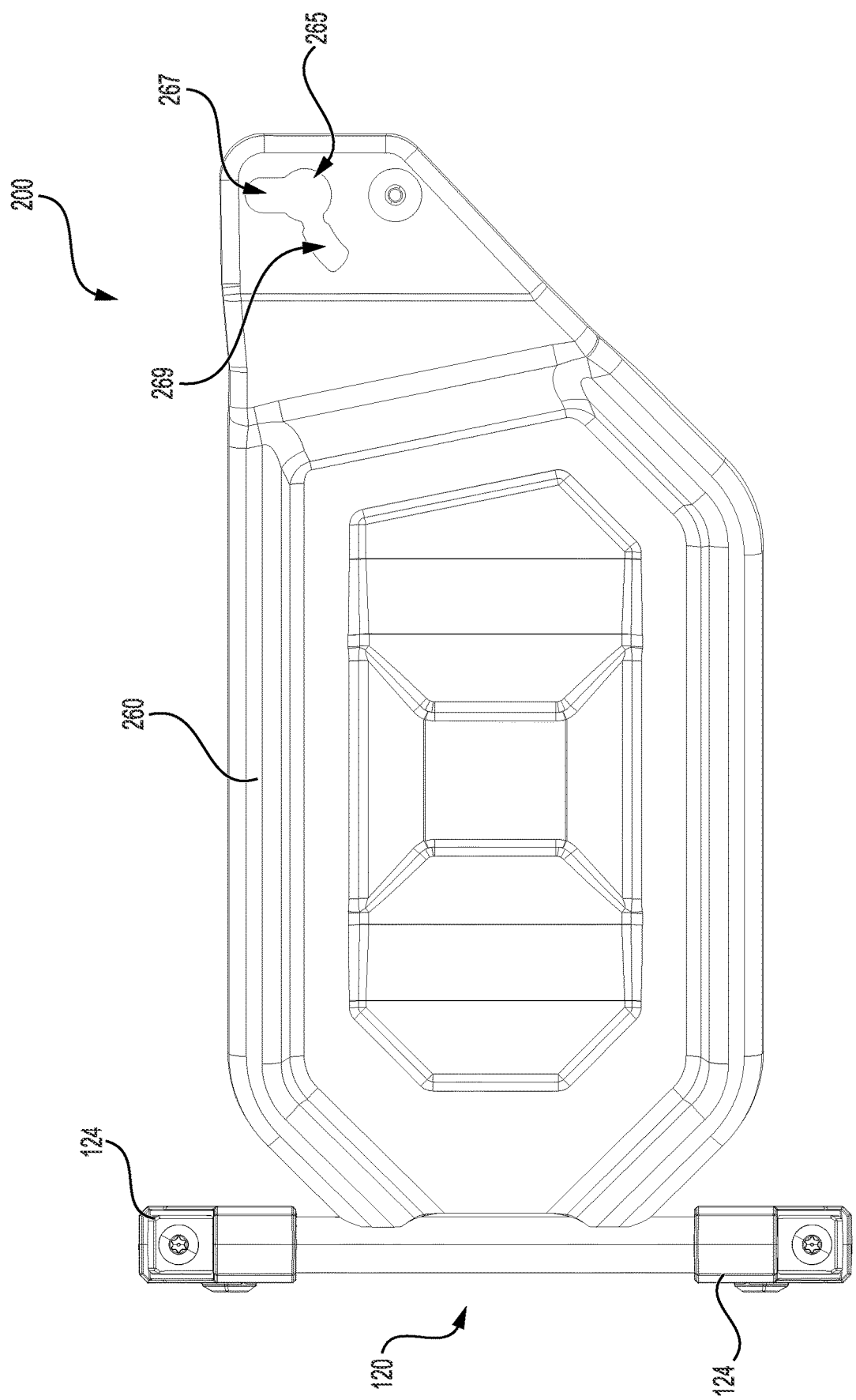
FIG. 18 is a right side elevation view of a cargo box extension assembly according to another non-limiting embodiment of the present technology, with a right panel in an open position.

Each hinge 180 includes one portion 182 of the hinge 180 being connected to the panel 120 and a cooperating portion 186 being connected to the surface 199. In the present embodiment, a male hinge portion 182 of each hinge 180 is connected to the center panel 120, specifically the portions 182 are welded to the bottom member 125 of the frame 122. A cooperating female hinge portion 186 for each hinge 180 is connected to the surface 199. In this embodiment, the female hinge portions 186 are fastened to the surface 199 by fasteners (not shown) inserted through apertures 188 (one of which is seen in FIG. 17) of the female hinge portions 186. In some embodiments, the female hinge portions 186 could be connected to the center panel 120, the male hinge portions 182 then being connected to the tailgate 99.

The male and female hinge portions 182, 186 are arranged for selectively remaining connected and selectively separating. Each male hinge portion 182 includes a cylindrical member 183 extending parallel to the bottom member 125 of the frame 122. Each male hinge portion 182 also includes a non-cylindrical end portion 185 disposed at a distal end of the cylindrical member 183. The particular end portion shape could vary in different embodiments, but generally the shape is such that the end portion 185 has a maximum outer diameter greater than an outer diameter of the cylindrical member 183. In the present embodiment, the distal end portion 185 is generally bow-tie shaped, with two arc portions extending out from a cylindrical center. In the present embodiment, the cylindrical member 183 and the end portion 185 are integrally formed, but it is contemplated that this could vary.

Each female hinge portion 186 defines an aperture 187 to receive a corresponding one of the male hinge portions 182 therethrough. The aperture 187 is non-circular, specifically bow-tie shaped in the present embodiment, such that the aperture 187 is sized and arranged to receive the distal end portion 185 therethrough at one or more pre-determined relative orientations between the male hinge portions 182 and the female hinge portions 186, also referred to as a separation position.

The aperture 187 is specifically sized and arranged to impede the distal end portion 185 from passing therethrough when the hinges 180 are not arranged at the pre-determined relative orientation and to allow rotation of the cylinder member 183 therein when the cylinder member 183 is disposed in and extends through the aperture 187 (see also FIG. 10). In the present embodiment, a center portion of the aperture 197 has a circular form to allow free rotation of the cylindrical member 183 therein, but the specific shape of the aperture 187 could vary.

As the male hinge portions 182 extend generally parallel to the bottom member 125, and the apertures 187 are arranged orthogonal to the member 125, the hinges 180 are arranged to be selectively separated (or assembled) by translating the male hinge portions 182 laterally (left to right for separation, right to left for assembly). The center panel 120, and thus the cargo box extension assembly 100, is thereby configured and arranged to be removed from the tailgate 99 by translation. It is noted that in some embodiments the direction the male hinge portions 182 extend could be reversed, thus reversing the directions for separating and assembling the hinges 180.

In order to remove the assembly 100, the male hinge portion 182 is rotated (i.e. the assembly 100 is rotated) to the pre-determined relative orientation such that the shapes of the distal end portion 185 and the aperture 187 are aligned to allow the end portion 185 to fit through the aperture 187. To avoid unintentional separation of the assembly 100 from the tailgate 99, the aperture 187 and the distal end portion 185 are not arranged in the pre-determined relative orientation when the cargo box extension assembly 100 is in the collapsed position (see FIG. 12). Similarly, the aperture 187 and the distal end portion 185 are not arranged in the pre-determined relative orientation when the cargo box extension assembly 100 is in the extended position (see FIG. 11).

Figure 13:
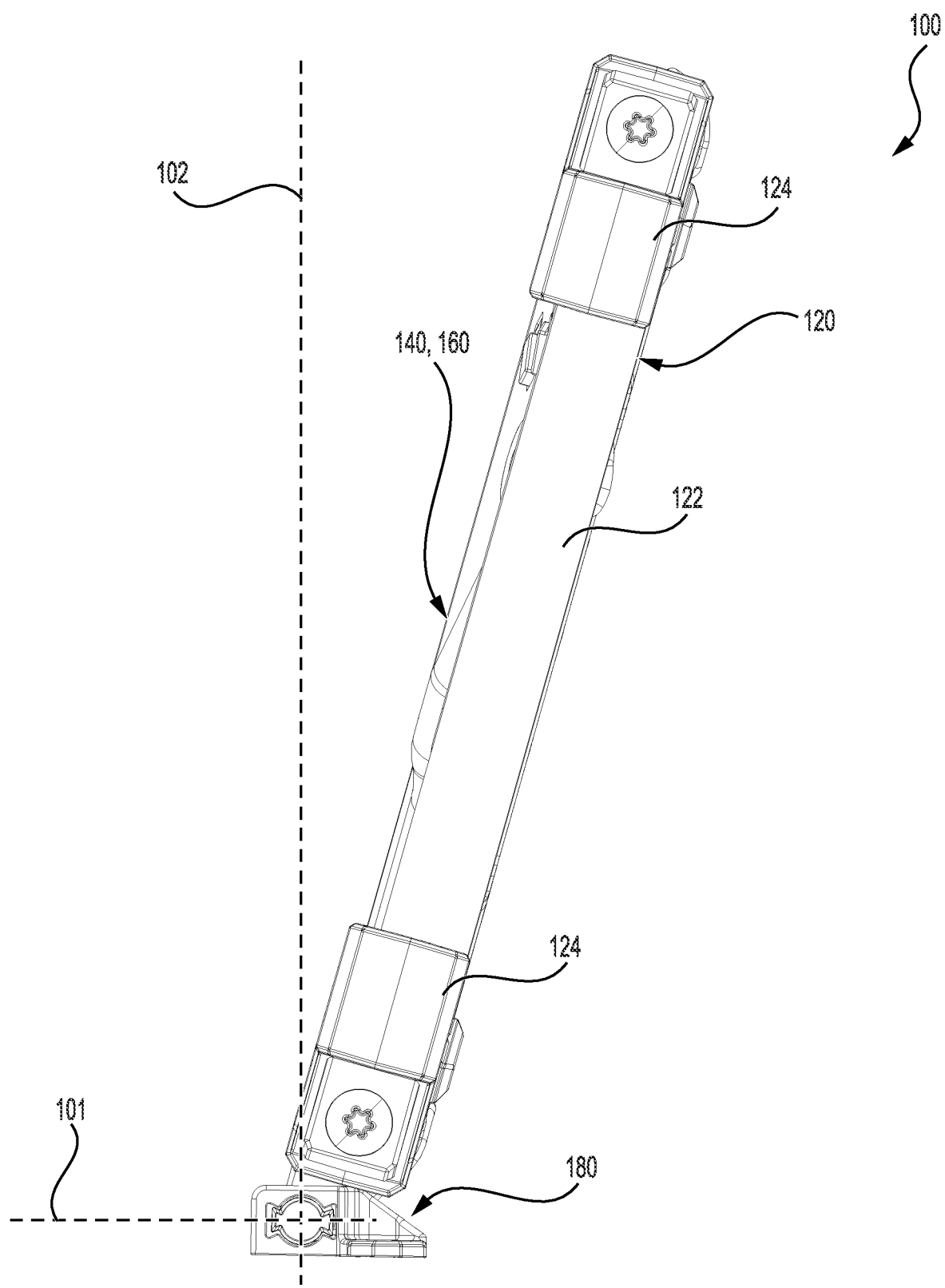
FIG. 13 is a left side elevation view of the cargo box extension assembly of FIG. 9, in a separation position.

In the present embodiment, the pre-determined relative orientation for selectively separating the hinge portions 182, 186 is attained when the assembly 100 is rotated past vertical, as is illustrated in see FIG. 13. While the specific angle for separation could vary, by not arranging the hinges 180 to be separable between the collapsed position (represented by line 101) and the extended position (102), the hinges 180 remain assembled during standard use. Upon deciding to remove the assembly 100, however, an operator simply rotates a top edge of the center panel 120 farther rearward from vertical and then slides the panel 120 toward the right. This arrangement contributes to the ease of use, as this provides a "tool-less" installation and removal of the assembly 100 and no additional tools are required to be stored or transported to manage the assembly 100.

The tailgate 99 also includes two fasteners 196, specifically partially deformable latches 196, for selectively maintaining the assembly 100 in the collapsed position and in the recess 195. While the relative arrangement of the hinges 180 above the assembly 100 aid in maintaining the assembly 100 in place when the tailgate 99 is in the closed position, the latches 196 aid in reducing vibration and knocking of the assembly 100, for instance when traveling over uneven terrain. In the present embodiment, the latches 196 extend over the top left and top right brackets 124 and are secured to a hook 126 integrally connected to each bracket 124 (see FIG. 5). It is contemplated that more or fewer latches 196 could be used in different embodiments. It is also contemplated that different means for maintaining the assembly 100 in the recess 195 could be used.

With reference to FIGS. 18 to 23, another embodiment of a cargo box extension assembly 200 is illustrated. Elements of the cargo box extension assembly 200 that are similar to those of the cargo box extension assembly 100 retain the same reference numeral and will generally not be described again.

The assembly 200 includes a right panel 260 pivotally connected to a right end portion of the center panel 120. The assembly 200 also includes a left panel (not shown) pivotally connected the center panel 120. The left panel is a mirror image of the right panel 260, and as such will not be separately described.

The left panel and the right panels 260, when the assembly 200 is in the extended position, are selectively connected to rear portions of the left and right walls 95, 97 of the cargo box 90, similarly to the panels 140, 160.

The panel 260 has an aperture 265 defined therein. The aperture 265 has a main portion 267 sized and arranged to receive therein the post 107 extending inward from a corresponding one of the left and right walls 95, 97 (only the post 107 on the right wall 97 being shown). The main portion 267 of the aperture 265 is larger at a bottom portion, similarly to the aperture 165 of the panels 140, 160. The aperture 265 also has a slot portion 269 extending from the main portion 265.

Figure 19:
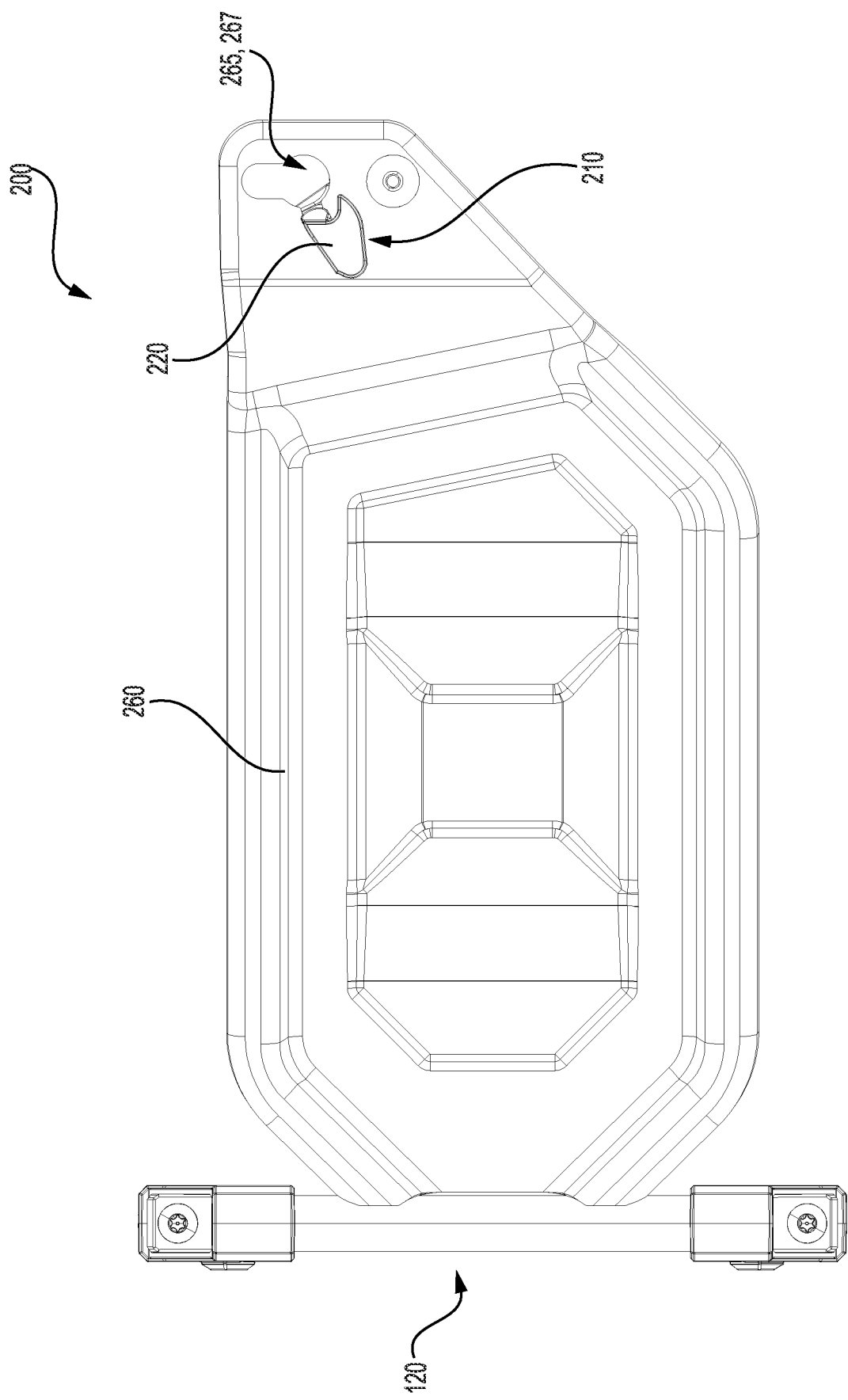
FIG. 19 is a right side elevation view of the cargo box extension of FIG. 18, with the right panel in the open position and a fastener connected to the right panel.
Figure 20:
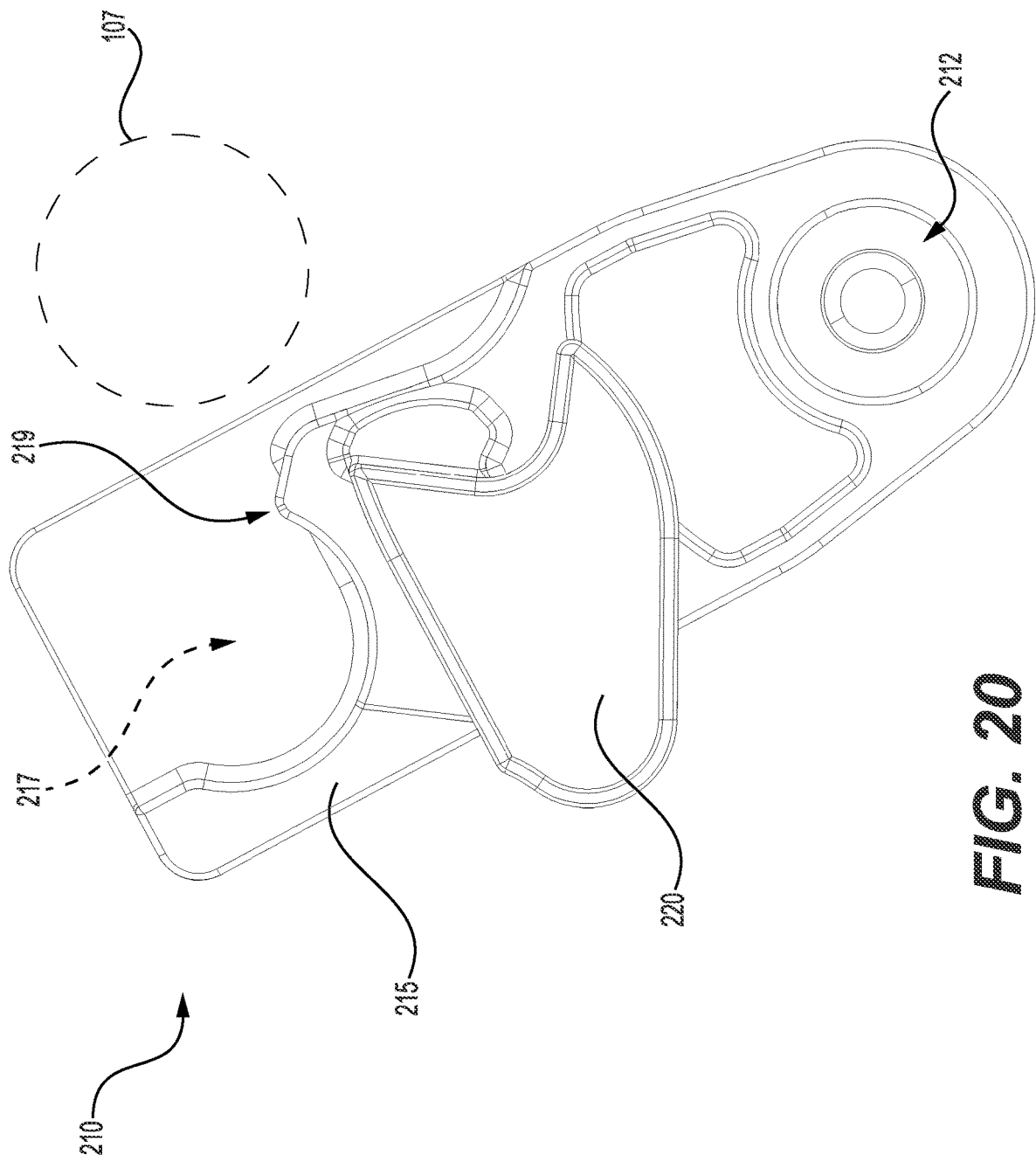
FIG. 20 is a side elevation view of the fastener of FIG. 19, shown in isolation.

The panel 260 also includes a fastener 210, shown in isolation in FIG. 20. The fastener 210 is pivotally connected to the panel 260 by a screw 212, below the main portion 267 of the aperture 265. The fastener 210 has a fastener body 215, generally formed from a rigid plastic material. The fastener body 215 has a recess 217 formed therein for selectively receiving the post 107. The fastener body 215 includes a raised edge 219 along one side of the recess 217, sized and arranged for aiding in maintaining the post 107 in the recess 217. The fastener body 215 also includes a protrusion 220. The fastener 210 is pivotally connected to an interior side of the panel 260, with the protrusion 220 extending through the slot portion 269 of the aperture 265. A wider distal portion of the protrusion 220 is disposed on an exterior side of the panel 260, as can be seen in FIG. 19. The protrusion 220 supports the fastener 210 during movement of the fastener 210, to aid in preventing bending or breaking of the fastener body 215 and the screw 212.

Figure 21:
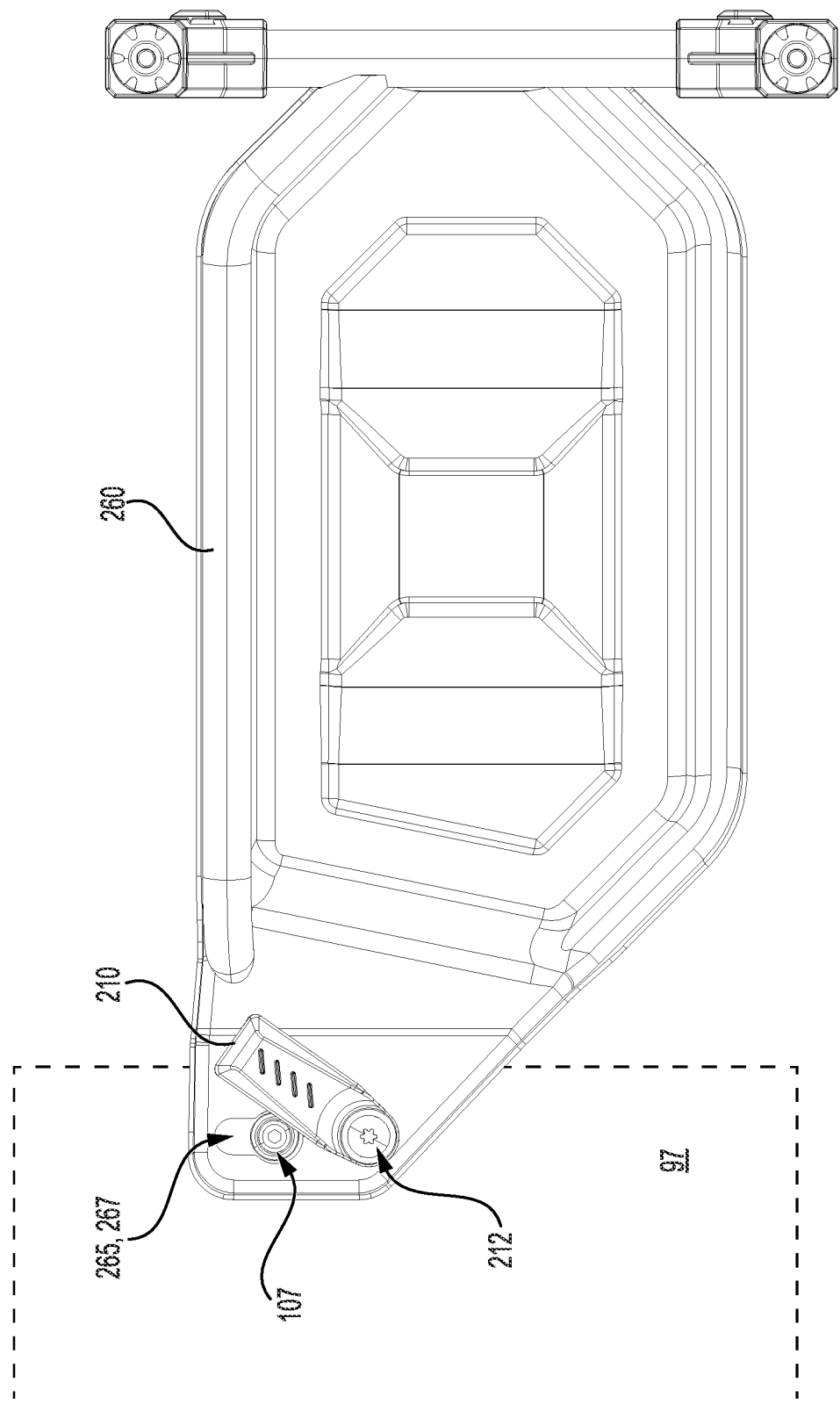
FIG. 21 is a left side elevation view of the right panel of FIG. 18 and a schematic portion of the right wall of the cargo box of the vehicle of FIG. 1, in a first partially connected position.
Figure 22:
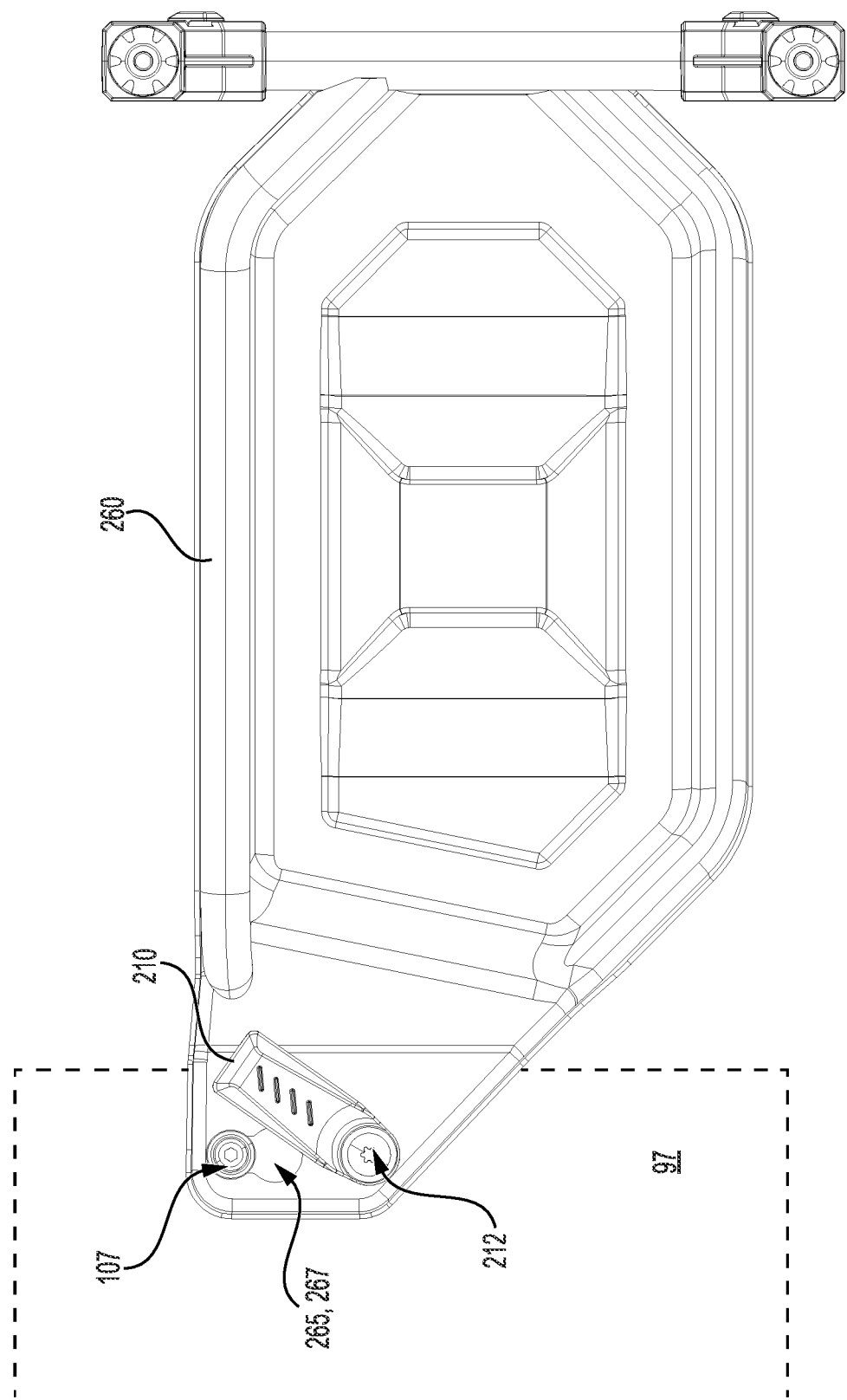
FIG. 22 is the left side elevation view of the right panel and the schematic portion of the right wall of the cargo box of FIG. 18, in a second partially connected position.
Figure 23:
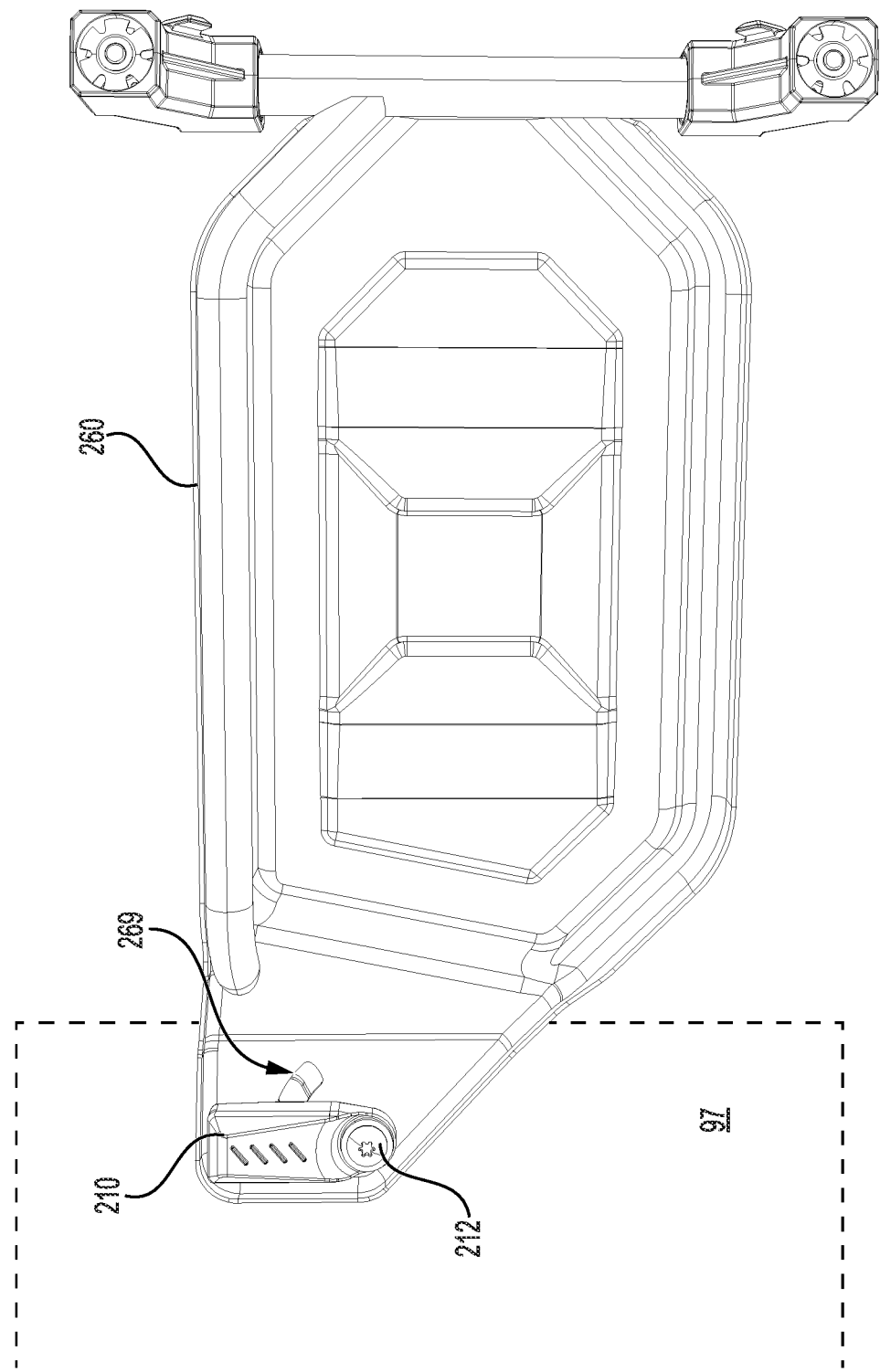
FIG. 23 is the left side elevation view of the right panel and the schematic portion of the right wall of the cargo box of FIG. 18, in a connected position.

To connect the right panel 260 to the right wall 97, the right panel 260 is first pivoted to the right wall 97 and the post 107 is inserted through the larger bottom portion of the main portion 267 of the aperture 265 (FIG. 21). In some cases, the panel 260 may need to be pivoted slightly upward relative to the wall 97 to insert the post 107. The distal end of the panel 260 is then adjusted slightly downward to pass the smaller upper portion of the main portion 267 of the aperture 267 over the post 107, behind the wider distal portion of the post 107 (FIG. 22). The fastener 210 is then pivoted to align the recess 217 with the post 107, with some force to pass the post 107 over the raised edge 219 generally being required (FIG. 23). In this way, the panel 260 is secured in the open position. The same procedure is followed to connect the left panel to the left wall 95, mutatis mutandis.

While the cargo box extension assemblies 100, 200 are described herein as being provided with the SSV 40, it is contemplated that in some cases, the assemblies 100, 200 could be provided separately, for instance as an accessory kit, to an operator having previously acquired a vehicle. In some embodiments, the assemblies 100, 200 could be provided with one or both portions 182, 186 of the hinges 180. Similarly, the tailgate assembly 98, including the tailgate 99 (with the recess 195) and one of the assemblies 100, 200 could be provided as a kit to replace a different embodiment of a tailgate on a given vehicle.

Figure 24:
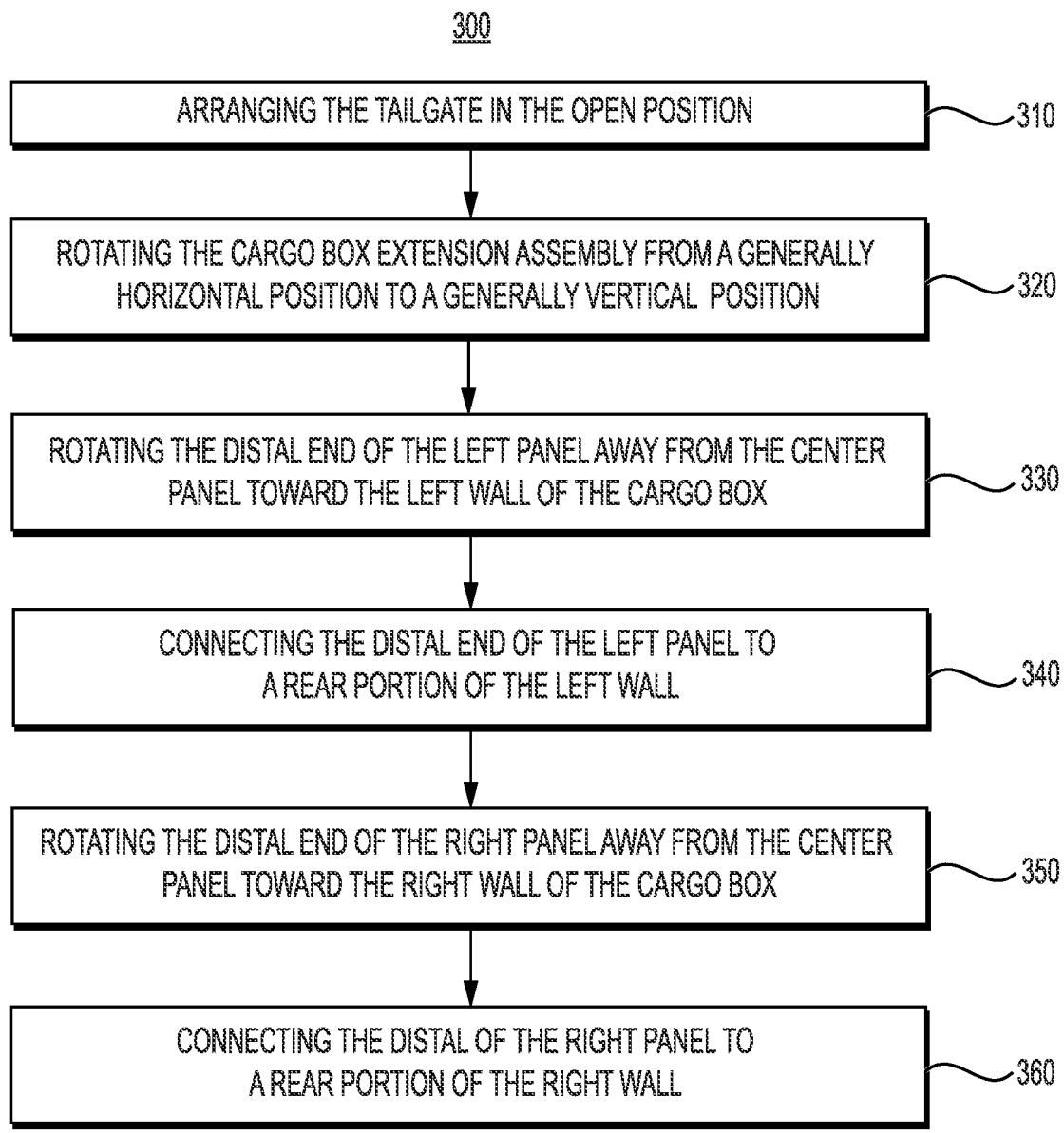
FIG. 24 is a flowchart illustrating a non-limiting embodiment of a method for installing the cargo box extension assembly of FIG. 9.

In reference to FIG. 24, a non-limiting embodiment of a method 300 for installing a cargo box extension for the cargo box 90 using the cargo box extension assembly 100 is illustrated. The method 300 is described herein for the assembly 100 having previously been installed in the tailgate 99, although it is contemplated that the method 300 could begin with installation of the assembly 100. Additional method steps for installation are included below.

The method 300 begins, at step 310, with arranging the tailgate 99 in the open position, where the front surface 199 of the tailgate 99 is generally horizontal.

The method 300 continues, at step 320, with rotating the cargo box extension assembly 100 from a generally horizontal position to a generally vertical position. As the assembly 100 is pivotally connected to the top portion of the tailgate 99 (and thus in a rearward position when the tailgate 99 is in the open position), the edge of the assembly 100 opposite the hinges 180 is rotated upward and rearward out of the recess 195.

The method 300 continues, at step 330, with rotating the distal end 144 of the left panel 140 away from the center panel 120 toward the left wall 95 of the cargo box 90. The method 300 then continues, at step 340, with connecting the distal end 144 of the left panel 140 to a rear portion of the left wall 95.

The method 300 continues, at step 350, with rotating the distal end 164 of the right panel 160 away from the center panel 120 toward the right wall 97 of the cargo box 90. The method 300 then continues, at step 360, with connecting the distal end 164 of the right panel 160 to the rear portion of the right wall 97.

It is noted that the steps 330 and 350, and the steps 340 and 360, can be performed in a different order, depending on the particular implementation of the method 300.

In some embodiments, the method 300 could further include removing the cargo box extension assembly 100 from the SSV 40. When the assembly 100 is in the extended position, removing the assembly from the SSV 40 begins with disconnecting the distal end 144 of the left panel 140 from the left wall 95 and rotating the distal end 144 away from the left wall 95. The method 300 would then continue with disconnecting the distal end 144 of the right panel 140 from the right wall 97 and then rotating the distal end 144 of the right panel 140 away from the right wall 97. In this case, it is again contemplated that the order of disconnecting and rotating the left and right panels 140, 160 could be modified.

The assembly 100, with the panels 140, 160 in the closed position, is then rotated from the generally vertical position rearward past vertical to the pre-determined relative orientation of the hinge portions 182, 186. At the pre-determined relative orientation, the method 300 would then continue with translating the cargo box extension assembly 100 horizontally (in this case, left to right) to remove the male hinge portions 182 from female hinge portions 186, thereby disconnecting the cargo box extension assembly 100 from the tailgate 99.

When the cargo box extension assembly 100 is not installed in the SSV 40, the method 300 could further include, prior to rotating the cargo box extension assembly 100 at step 320, installing the assembly 100 in the tailgate 99.

For installing the assembly 100, the assembly 100 would first be placed on the tailgate 99 at the pre-determined relative orientation, with the male portions 182 disposed on a right side of the female portions 186. The method 300 would then continue with sliding the assembly 100 horizontally (right to left) such that the distal end portions 185 of the male hinge portions 182 pass through the apertures 187 of the female hinge portions 186.

With the hinges 180 thus connected, the assembly 100 can then subsequently be rotated to a generally vertical position (to then be arranged in the extended position) or rotated to a generally horizontal position (to be arranged in the collapsed position).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A cargo box extension assembly for a cargo box of a vehicle, the assembly comprising:
a center panel configured and arranged for pivotally connecting to a front surface of a tailgate of the cargo box;
a left panel pivotally connected to a left end portion of the center panel at a first end of the left panel, a second end of the left panel being configured to selectively connect to a left, rear portion of the cargo box;
a right panel pivotally connected to a right end portion of the center panel at a first end of the right panel, a second end of the right panel being configured to selectively connect to a right, rear portion of the cargo box,
each of the left panel and the right panel being rotatable between at least an open position and a closed position,
in the open position, the second end of each of the left panel and the right panel being rotated outward away from the center panel,
in the closed position, the second end of each of the left panel and the right panel being rotated inward toward the center panel, each of the left panel and the right panel being arranged generally parallel to the center panel and aligned with each other,
when the cargo box extension assembly is installed on the tailgate of the vehicle and the center panel is pivotally connected to the front surface of the tailgate:
the cargo box extension assembly being selectively movable between at least a collapsed position and an extended position;
in the collapsed position:
each of the left panel and the right panel being arranged in the closed position,
the center panel being arranged generally parallel to the front surface of the tailgate, and
the cargo box extension assembly being at least partially received in a recess of the front surface of the tailgate,
in the extended position:
the center panel is arranged generally perpendicular to the front surface of the tailgate, and
each of the left panel and the right panel are arranged in the open position,
the cargo box extension assembly being selectively movable to a storage position with the center panel remaining pivotally connected to the front surface of the tailgate; and
at least one first hinge portion connected to the center panel, the at least one hinge portion being configured to pivotally connect to at least one second hinge portion connected to the tailgate,
the at least one first hinged portion including:
a first left hinge portion, and
a first right hinge portion;
the at least one second hinge portion including:
a second left hinge portion, and
a second right hinge portion;
the first left hinge portion being configured to pivotally connect to the second left hinge portion,
the first right hinge portion being configured to pivotally connect to the second right hinge portion,
the first left hinge portion and the first right hinge portion extending in a same direction,
the first left hinge portion and the first right hinge portion being arranged to be removed from and inserted into the second left hinge portion and the second right hinge portion by translation, the cargo box extension assembly thereby being configured and arranged to be removed from the tailgate by translation.

2. The cargo box extension assembly of claim 1, wherein:
the center panel defines at least one panel recess; and
when in the closed position, the left panel and the right panel are at least partially received in the at least one panel recess.

3. The cargo box extension assembly of claim 1, further comprising the at least one second hinge portion configured to connect to the tailgate.

4. The cargo box extension assembly of claim 1, wherein:
the at least one first hinge portion is at least one male hinge portion; and the at least one second hinge portion is at least one female hinge portion defining an aperture therein for receiving the at least one male hinge portion.

5. The cargo box extension assembly of claim 4, wherein:
the at least one male hinge portion includes:
a cylindrical member, and
a non-cylindrical distal end portion disposed at a distal end of the cylindrical member, the distal end portion having a maximum outer diameter greater than an outer diameter of the cylindrical member;
the aperture of the at least one female hinge portion is non-circular, the aperture being sized and arranged to receive the distal end portion of the at least one male hinge portion therethrough at at least one pre-determined relative orientation between the at least one male hinge portion and the at least one female hinge portion;
the aperture is sized and arranged to impede the distal end portion from passing therethrough when the at least one male hinge portion and the at least one female hinge portion are not arranged at the at least one pre-determined relative orientation; and
the aperture is sized and arranged to allow rotation of the cylinder member therein when the cylinder member is disposed in the aperture.

6. The cargo box extension assembly of claim 5, wherein:
when the assembly is installed on the tailgate of the vehicle and the center panel is pivotally connected to the front surface of the tailgate:
the cargo box extension assembly is selectively movable between at least a collapsed position and an extended position;
in the collapsed position:
each of the left panel and the right panel are arranged in the closed position, and
the center panel is arranged generally parallel to the front surface of the tailgate;
in the extended position:
the center panel is arranged generally perpendicular to the front surface of the tailgate, and
each of the left panel and the right panel are arranged in the open position;
the aperture and the distal end portion are not arranged in the at least one pre-determined relative orientation when the cargo box extension assembly is in the collapsed position; and
the aperture and the distal end portion are not arranged in the at least one pre-determined relative orientation when the cargo box extension assembly is in the extended position.

7. The cargo box extension assembly of claim 6, wherein, to align the aperture and the distal end portion at the at least one pre-determined relative orientation, the center panel is rotated past vertical.

8. The cargo box extension assembly of claim 5, wherein:
the distal end portion of the at least one male hinge portion is generally bow-tie shaped; and
the aperture of the at least one female hinge portion is generally bow-tie shaped.

9. The cargo box extension assembly of claim 1, wherein the center panel includes:
a frame; and
a wall portion connected to the frame.

10. The cargo box extension assembly of claim 9, wherein the frame comprises:
a plurality of rigid members including a top member, a bottom member, a left member and a right member; and
a plurality of corner brackets connecting the plurality of rigid members together.

11. The cargo box extension assembly of claim 10, wherein:
the top member is fastened to a top, left bracket and a top, right bracket of the plurality of corner brackets;
the bottom member is fastened to a bottom, left bracket and a bottom, right bracket of the plurality of corner brackets;
the right member is pivotally connected to the top, right bracket and the bottom, right bracket; and
the left member is pivotally connected to the top, left bracket and the bottom, left bracket.

12. The cargo box extension assembly of claim 10, wherein:
the first end of the right panel is connected to the right member of the frame; and
the first end of the left panel is connected to the left member of the frame.

13. A method for installing a cargo box extension for a cargo box of a vehicle using a cargo box extension assembly, the cargo box extension assembly comprising:
a center panel pivotally connected to the front surface of the tailgate,
a left panel pivotally connected to a left side of the center panel, and
a right panel pivotally connected to a right side of the center panel;
the method comprising:
arranging a tailgate of the cargo box in an open position, a front surface of the tailgate being generally vertical in a closed position and generally horizontal in the open position;
rotating the cargo box extension assembly from a generally horizontal position to a generally vertical position, the cargo box extension assembly being pivotally connected to the front surface of the tailgate,
in the generally horizontal position, the cargo box extension assembly being at least partially received in a recess in the front surface of the tailgate, rotating the cargo box extension assembly to the generally vertical position including rotating the cargo box extension out of the recess,
rotating a distal end of the left panel away from the center panel toward a left wall of the cargo box;
connecting the distal end of the left panel to a rear portion of the left wall of the cargo box;
rotating a distal end of the right panel away from the center panel toward a right wall of the cargo box;
connecting the distal end of the right panel to a rear portion of the right wall of the cargo box; and
removing the cargo box extension assembly from the vehicle comprising:
disconnecting the distal end of the left panel from the rear portion of the left wall of the cargo box;
rotating the distal end of the left panel away from the left wall toward the center panel;
disconnecting the distal end of the right panel from the rear portion of the right wall of the cargo box;
rotating the distal end of the right panel away from the right wall toward the center panel;
rotating the cargo box extension assembly from the generally vertical position rearward past vertical to a pre-determined relative orientation of at least one female hinge portion and at least one male hinge portion; and translating the cargo box extension assembly horizontally to remove the at least one male hinge portion from the at least one female hinge portion, thereby disconnecting the cargo box extension assembly from the tailgate.

14. A cargo box extension assembly for a cargo box of a vehicle, the assembly comprising:
a center panel configured and arranged for pivotally connecting to a front surface of a tailgate of the cargo box;
a left panel pivotally connected to a left end portion of the center panel at a first end of the left panel, a second end of the left panel being configured to selectively connect to a left, rear portion of the cargo box; and
a right panel pivotally connected to a right end portion of the center panel at a first end of the right panel, a second end of the right panel being configured to selectively connect to a right, rear portion of the cargo box,
each of the left panel and the right panel being rotatable between at least an open position and a closed position,
in the open position, the second end of each of the left panel and the right panel being rotated outward away from the center panel,
in the closed position, the second end of each of the left panel and the right panel being rotated inward toward the center panel, each of the left panel and the right panel being arranged generally parallel to the center panel and aligned with each other,
when the cargo box extension assembly is installed on the tailgate of the vehicle and the center panel is pivotally connected to the front surface of the tailgate:
the cargo box extension assembly being selectively movable between at least a collapsed position and an extended position;
in the collapsed position:
each of the left panel and the right panel being arranged in the closed position,
the center panel being arranged generally parallel to the front surface of the tailgate, and
the cargo box extension assembly being at least partially received in a recess of the front surface of the tailgate,
in the extended position:
the center panel is arranged generally perpendicular to the front surface of the tailgate,
each of the left panel and the right panel are arranged in the open position,
the cargo box extension assembly being selectively movable to a storage position with the center panel remaining pivotally connected to the front surface of the tailgate; and
at least one male hinge portion connected to the center panel, the at least one male hinge portion being configured to pivotally connect to at least one female hinge portion connected to the tailgate, the at least one female hinge portion defining an aperture therein for receiving the at least one male portion,
the at least one male hinge portion including:
a cylindrical member, and
a non-cylindrical distal end portion disposed at a distal end of the cylindrical member, the distal end portion having a maximum outer diameter greater than an outer diameter of the cylindrical member;
the aperture of the at least one female hinge portion being non-circular, the aperture being sized and arranged to receive the distal end portion of the at least one male hinge portion therethrough at least one pre-determined relative orientation between the at least one male hinge portion and the at least one female hinge portion;
the aperture is sized and arranged to impede the distal end portion from passing therethrough when the at least one male hinge portion and the at least one female hinge portion are not arranged at the at least one pre-determined relative orientation; and
the aperture is sized and arranged to allow rotation of the cylinder member therein when the cylinder member is disposed in the aperture.

15. The cargo box extension assembly of claim 14, wherein:
when the assembly is installed on the tailgate of the vehicle and the center panel is pivotally connected to the front surface of the tailgate:
the cargo box extension assembly is selectively movable between at least a collapsed position and an extended position;
in the collapsed position:
each of the left panel and the right panel are arranged in the closed position, and
the center panel is arranged generally parallel to the front surface of the tailgate;
in the extended position:
the center panel is arranged generally perpendicular to the front surface of the tailgate, and
each of the left panel and the right panel are arranged in the open position;
the aperture and the distal end portion are not arranged in the at least one pre-determined relative orientation when the cargo box extension assembly is in the collapsed position; and
the aperture and the distal end portion are not arranged in the at least one pre-determined relative orientation when the cargo box extension assembly is in the extended position.

16. The cargo box extension assembly of claim 15, wherein, to align the aperture and the distal end portion at the at least one pre-determined relative orientation, the center panel is rotated past vertical.

17. The cargo box extension assembly of claim 14, wherein:
the distal end portion of the at least one male hinge portion is generally bow-tie shaped; and
the aperture of the at least one female hinge portion is generally bow-tie shaped.

18. The cargo box extension assembly of claim 14, wherein the center panel includes:
a frame; and
a wall portion connected to the frame.

* * * * *